United States Patent
Tamura

(10) Patent No.: US 10,732,485 B2
(45) Date of Patent: Aug. 4, 2020

(54) IMAGING SUPPORT DEVICE, AND METHOD FOR OPERATING IMAGING SUPPORT DEVICE

(71) Applicant: FUJIFILM Corporation, Tokyo (JP)

(72) Inventor: Kazunori Tamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/054,075

(22) Filed: Aug. 3, 2018

(65) Prior Publication Data

US 2018/0343374 A1  Nov. 29, 2018

Related U.S. Application Data

(63) Continuation of application No. PCT/JP2016/086993, filed on Dec. 13, 2016.

(30) Foreign Application Priority Data

Feb. 4, 2016  (JP) .................. 2016-019981

(51) Int. Cl.
*G03B 7/16* (2014.01)
*H04N 5/232* (2006.01)
(Continued)

(52) U.S. Cl.
CPC ............... *G03B 7/16* (2013.01); *G03B 15/00* (2013.01); *G03B 15/05* (2013.01); *G03B 15/07* (2013.01);
(Continued)

(58) Field of Classification Search
CPC ............... G06K 9/2027; G06K 9/2036; G03B 2215/05–0596; G03B 15/02–05;
(Continued)

(56) References Cited

U.S. PATENT DOCUMENTS

2004/0114043 A1  6/2004 Belliveau
2005/0264685 A1  12/2005 Hoshuyama et al.
(Continued)

FOREIGN PATENT DOCUMENTS

CN  1702538 A  11/2005
CN  101075072 A  11/2007
(Continued)

OTHER PUBLICATIONS

International Preliminary Report on Patentability and Written Opinion of the International Searching Authority (forms PCT/IB/373, PCT/ISA/237 and PCT/IB/326), dated Aug. 16, 2018, for corresponding International Application No. PCT/JP2016/086993, with an English translation of the Written Opinion.
(Continued)

*Primary Examiner* — Xi Wang
(74) *Attorney, Agent, or Firm* — Birch, Stewart, Kolasch & Birch, LLP

(57) ABSTRACT

An illumination control unit selectively turns on strobe devices and a strobe light emitting unit. An image acquisition unit captures an image of an object through an imaging element and acquires individual illumination images. An individual irradiation area detection unit detects individual irradiation areas which are areas irradiated with each illumination light component in the imaging range of the imaging element on the basis of the individual illumination images. An irradiation area image generation unit generates an irradiation area image obtained by inserting division marks indicating each individual irradiation area into the image of the object. An irradiation area image output unit displays the irradiation area image on a rear display unit. The user observes the irradiation area image and can simply recognize each individual irradiation area.

10 Claims, 14 Drawing Sheets

(51) Int. Cl.

| | | |
|---|---|---|
| *G06F 3/03* | (2006.01) | |
| *G06F 3/0484* | (2013.01) | |
| *G06F 3/01* | (2006.01) | |
| *G03B 15/00* | (2006.01) | |
| *G06F 3/0488* | (2013.01) | |
| *G03B 15/07* | (2006.01) | |
| *H04N 5/235* | (2006.01) | |
| *H04N 5/262* | (2006.01) | |
| *H04N 5/225* | (2006.01) | |
| *G03B 15/05* | (2006.01) | |

(52) U.S. Cl.
 CPC ............ *G06F 3/017* (2013.01); *G06F 3/0304* (2013.01); *G06F 3/04847* (2013.01); *G06F 3/04883* (2013.01); *H04N 5/2256* (2013.01); *H04N 5/232* (2013.01); *H04N 5/2351* (2013.01); *H04N 5/2353* (2013.01); *H04N 5/2354* (2013.01); *H04N 5/2355* (2013.01); *H04N 5/23216* (2013.01); *H04N 5/23219* (2013.01); *H04N 5/232933* (2018.08); *H04N 5/232935* (2018.08); *H04N 5/232945* (2018.08); *H04N 5/2625* (2013.01); *G06F 2203/04808* (2013.01)

(58) Field of Classification Search
 CPC .................................................. H04N 5/2354; H04N 5/2256; F21V 33/0052; H05B 33/0803–0896
 USPC .................... 396/61, 62, 106–110, 155–206; 362/3–18; 348/370–371, 222.1, 223.1
 See application file for complete search history.

(56) References Cited

U.S. PATENT DOCUMENTS

| | | | |
|---|---|---|---|
| 2008/0061683 A1* | 3/2008 | Bertram | H01L 51/5271 313/504 |
| 2008/0105745 A1* | 5/2008 | Lei | G06K 7/10722 235/462.1 |
| 2012/0002050 A1* | 1/2012 | Taniguchi | H04N 7/181 348/148 |
| 2013/0271618 A1 | 10/2013 | Koryakovskiy et al. | |
| 2014/0152876 A1* | 6/2014 | Adachi | G06T 7/254 348/239 |
| 2015/0281565 A1 | 10/2015 | Nakada | |
| 2016/0071289 A1* | 3/2016 | Kobayashi | G06T 5/50 382/167 |

FOREIGN PATENT DOCUMENTS

| | | |
|---|---|---|
| CN | 203912049 U | 10/2014 |
| EP | 1 858 254 A2 | 11/2007 |
| JP | 4-301304 A | 10/1992 |
| JP | 2001-111881 A | 4/2001 |
| JP | 2002-27316 A | 1/2002 |
| JP | 2007-281937 A | 10/2007 |
| JP | 2012-69423 A | 4/2012 |
| JP | 2013-223244 A | 10/2013 |
| JP | 2015-201839 A | 11/2015 |

OTHER PUBLICATIONS

International Search Report (form PCT/ISA/210), dated Mar. 7, 2017, for corresponding International Application No. PCT/JP2016/086993, with an English translation.

Chinese Office Action and Search Report dated Mar. 19, 2020, for corresponding Chinese Patent Application No. 201680080999.2, with partial translation.

* cited by examiner

FIG. 16
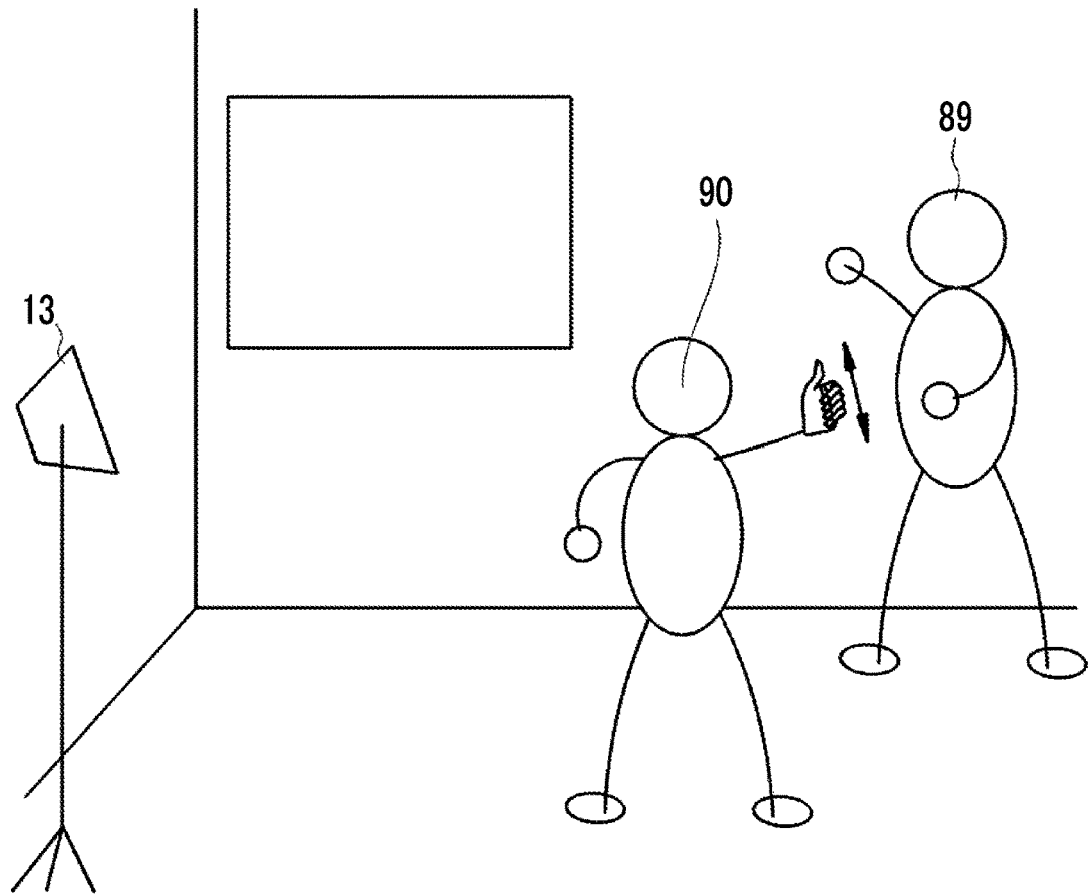
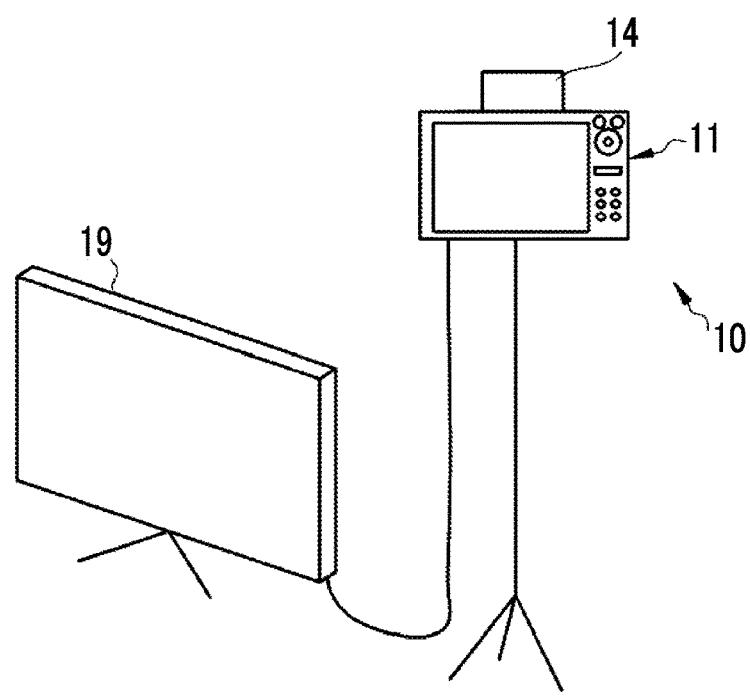

FIG. 20
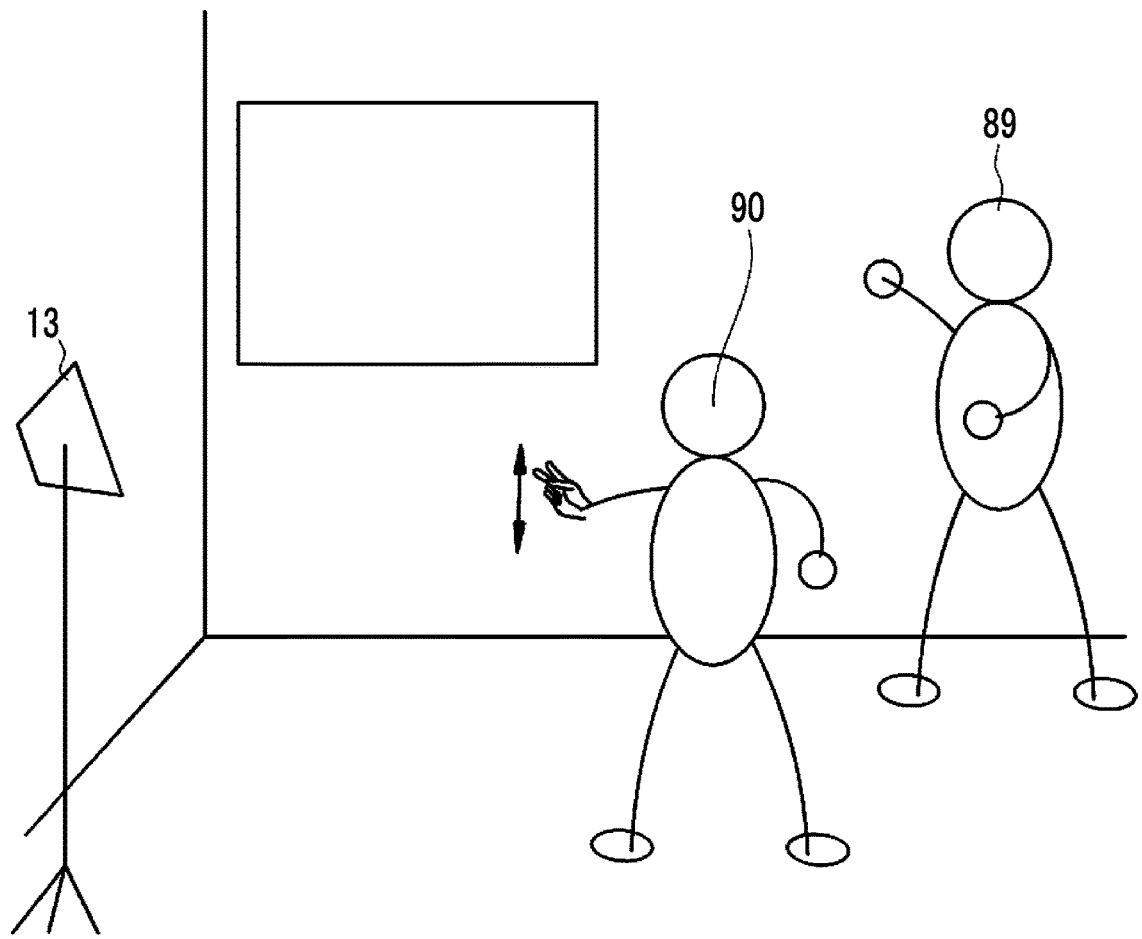
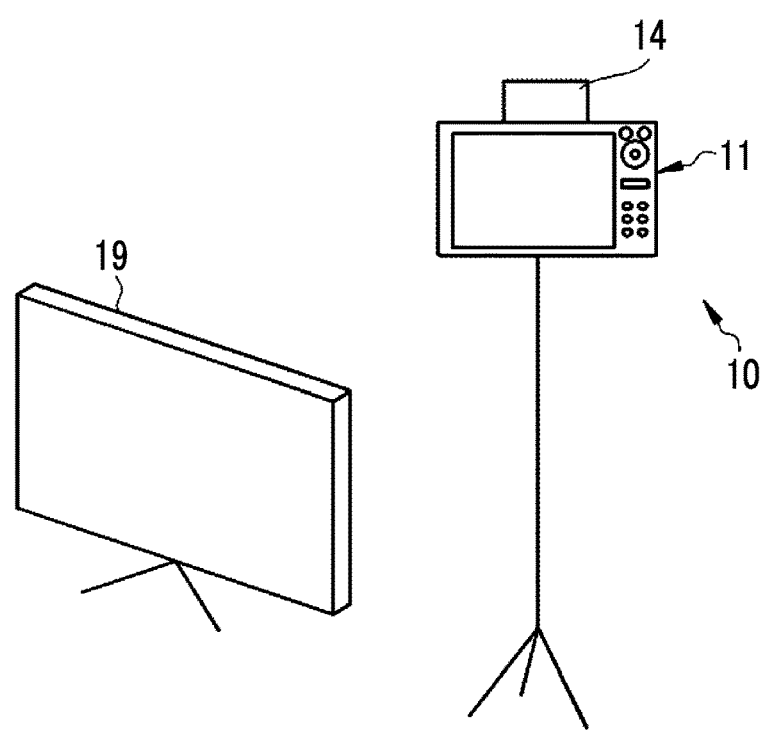

IMAGING SUPPORT DEVICE, AND METHOD FOR OPERATING IMAGING SUPPORT DEVICE

CROSS-REFERENCE TO RELATED APPLICATIONS

This application is a Continuation of PCT International Application No. PCT/JP2016/086993 filed on 13 Dec. 2016, which claims priority under 35 U.S.C. § 119(a) to Japanese Patent Application No. 2016-019981 filed on 4 Feb. 2016. The above application is hereby expressly incorporated by reference, in its entirety, into the present application.

BACKGROUND OF THE INVENTION

1. Field of the Invention

The present invention relates to an imaging support device using a plurality of illuminating devices, and a method for operating the imaging support device.

2. Description of the Related Art

In recent years, in a case in which images are taken under illumination or commemorative images are taken in a studio, plural illumination imaging has been performed which provides a plurality of illuminating devices on the left, right, upper, and lower sides of a person which is an object and in front of the person and irradiates the object with light in many directions to capture an image. In the plural illumination imaging, an irradiation area of each illuminating device in an imaging range varies depending on the arrangement of the illuminating devices. Therefore, the amount of irradiation light of each of the plurality of illuminating devices is adjusted to change the brightness of each irradiation area in the imaging range. As a result, it is possible to obtain a high-quality captured image in which the shading, texture, and three-dimensional appearance of an object are delicately expressed.

JP2002-27316A and JP2007-281937A disclose a technique which adjusts the amount of irradiation light of each illuminating device using image processing after imaging is completed in a case in which imaging is performed using a plurality of illuminating devices. For example, in JP2002-27316A, first, an image of an object is captured in a state in which a plurality of illuminating devices provided at different positions are turned on one by one to obtain a plurality of captured images for each illumination light component. Then, brightness adjustment is individually performed for the captured images for each illumination light component and the brightness-adjusted captured images for each illumination light component are combined to generate a composite image. The generation of the composite image or the change of brightness adjustment parameters is performed by, for example, a personal computer. A photographer changes, for example, the brightness adjustment parameters in the composite image to see a simulation image obtained in a case in which the amounts of irradiation light of a plurality of illuminating devices are changed in a pseudo manner.

SUMMARY OF THE INVENTION

In the techniques disclosed in JP2002-27316A and JP2007-281937A, the amounts of illumination light components are adjusted in a pseudo manner by the brightness adjustment of the captured image in image processing after imaging is completed. Therefore, for example, the shading, texture, and three-dimensional appearance of an object are less likely to be delicately expressed as intended by the photographer than those in a case in which the amounts of illumination light components are actually adjusted and imaging is performed. In order to achieve the delicate expression intended by the photographer, it is necessary to perform imaging after the amounts of illumination light components are actually adjusted such that the amount of each illumination light component is appropriate.

However, in order to perform imaging in a state in which the amounts of illumination light components are actually appropriately adjusted, first, the photographer roughly adjusts the amount of light of each illuminating device and then checks, for example, the shading and texture of the object through a preview image of a camera. Then, in a case in which the shading and texture are not expressed in the preview image as intended, the photographer needs to repeat an operation of determining an illuminating device that needs to be finely adjusted and readjusting the amount of light. Then, in order to check the illuminating device that needs to be readjusted, the photographer needs to check the position of an irradiation area of each illuminating device in the imaging range of the camera while seeing the actual arrangement of the illuminating devices.

For example, in a case in which there are many illuminating devices and various types of illuminating devices, such as floor-mounted illuminating devices and ceiling-mounted illuminating devices, are mixed as in an imaging studio, since the illuminating devices are provided at various positions or emit light in various directions, it takes a lot of time and effort to check each irradiation area of each illuminating device in the imaging range. In a case in which it is difficult to check each irradiation area, it is difficult to appropriately adjust the amount of light. For this reason, ways to simply check each irradiation area have been examined.

The invention has been made in view of the above-mentioned problems and an object of the invention is to provide an imaging support device that enables a user to simply check each irradiation area of each illuminating device in an imaging range in order to appropriately adjust the amounts of illumination light of a plurality of illuminating devices used for imaging, and a method for operating the imaging support device.

In order to achieve the object, an imaging support device according to the invention comprises an imaging element that captures an image of an object, an illumination control unit, an image acquisition unit, an individual irradiation area detection unit, an irradiation area image generation unit, and an irradiation area image output unit. The illumination control unit controls a plurality of illuminating devices illuminating the object. The image acquisition unit controls the imaging element and the illumination control unit such that the image of the object is acquired. The image acquisition unit selectively turns on the plurality of illuminating devices such that the object is selectively irradiated with illumination light components of the illuminating devices and acquires individual illumination images which are images of the object individually irradiated with the illumination light components. The individual irradiation area detection unit detects individual irradiation areas which are areas irradiated with the illumination light components in an imaging range of the imaging element on the basis of a plurality of the individual illumination images. The irradiation area image generation unit generates an irradiation area image obtained by inserting division marks indicating the detected individual irradiation areas into the image of the object. The irradiation area image output unit outputs the generated irradiation area image to a display unit.

Preferably, the individual irradiation area detection unit detects an area with a relatively high brightness as the individual irradiation area in each of the individual illumination images.

Preferably, the irradiation area image generation unit compares brightnesses of the plurality of individual irradiation areas detected from the individual illumination images and displays a magnitude relationship between the brightnesses of the individual irradiation areas in the irradiation area image. In this case, since the magnitude relationship between the brightnesses of the individual irradiation areas is displayed, it is possible to simply check the individual irradiation area in which the amount of light needs to be adjusted.

Preferably, the irradiation area image generation unit represents the magnitude relationship as at least one of the sizes of the individual irradiation areas, values corresponding to the brightnesses of the individual irradiation areas, or values corresponding to comparison results of the brightnesses of the individual irradiation areas in the irradiation area image.

Preferably, the imaging support device further comprises an operation input receiving unit that receives an input of an operation for adjusting the amount of light of each of the illuminating devices. Preferably, the illumination control unit has a function of transmitting a light amount adjustment signal to each of the illuminating devices in response to the input of the operation.

Preferably, the operation input receiving unit is a gesture detection unit and the gesture detection unit detects a gesture on the basis of the image captured by the imaging element and receives the input of the operation corresponding to the detected gesture. Preferably, the illumination control unit specifies one individual irradiation area among the plurality of individual irradiation areas detected by the individual irradiation area detection unit in the imaging range of the imaging element according to the gesture and transmits the light amount adjustment signal to the illuminating device corresponding to the specified individual irradiation area. In this case, it is possible to input the amount of light of each illuminating device at the position of a model, without getting near the camera or the illuminating device.

Preferably, each of the plurality of individual irradiation areas detected by the individual irradiation area detection unit in the imaging range of the imaging element is allocated as a gesture detection area for detecting the gesture as the input of the operation for each illuminating device. Preferably, the illumination control unit specifies the illuminating device whose amount of light is to be adjusted, on the basis of the gesture detection area in which the gesture is detected among the gesture detection areas.

Preferably, the display unit is a touch panel that enables a touch operation and the operation input receiving unit receives the input of the operation by the touch operation through the irradiation area image displayed on the touch panel. Preferably, the illumination control unit specifies the illuminating device whose amount of light is to be adjusted according to the positions of the individual irradiation areas in the irradiation area image and transmits the light amount adjustment signal to the specified illuminating device.

Preferably, in a case in which a pinch operation is performed over the plurality of individual irradiation areas in the touch panel, the operation input receiving unit integrates the plurality of individual irradiation areas in the irradiation area image to generate an integrated area. Preferably, in a case in which the input of the operation for the generated integrated area is performed, the illumination control unit collectively transmits the light amount adjustment signal to the plurality of illuminating devices. In this case, the illuminating devices are simply integrated.

A method for operating an imaging support device according to the invention comprises: an image acquisition step, an individual irradiation area detection step, an irradiation area image generation step, and an irradiation area image output step. In the image acquisition step, an illumination control unit that controls a plurality of illuminating devices illuminating an object and an imaging element that captures an image of the object are controlled such that the image of the object is acquired. In the image acquisition step, the plurality of illuminating devices are selectively turned on such that the object is irradiated with illumination light components of the illuminating devices and individual illumination images which are images of the object individually irradiated with the illumination light components are acquired. In the individual irradiation area detection step, individual irradiation areas which are areas irradiated with the illumination light components in an imaging range of the imaging element are detected on the basis of a plurality of the individual illumination images. In the irradiation area image generation step, an irradiation area image obtained by inserting division marks indicating the detected individual irradiation areas into the image of the object is generated. In the irradiation area image output step, the generated irradiation area image is output to a display unit.

According to the invention, it is possible to provide an imaging support device that enables a user to simply check each irradiation area of each illuminating device in an imaging range in order to appropriately adjust the amounts of illumination light of a plurality of illuminating devices used for imaging, and a method for operating the imaging support device.

BRIEF DESCRIPTION OF THE DRAWINGS

FIG. 16 is a perspective view illustrating an imaging system according to a third embodiment in which the amount of adjustment of the amount of light is input by a gesture.

FIG. 20 is a perspective view illustrating an imaging system in which the specification of an individual irradiation area and the input of the amount of adjustment of the amount of light are performed by another gesture.

DESCRIPTION OF THE PREFERRED EMBODIMENTS

First Embodiment

Figure 1:
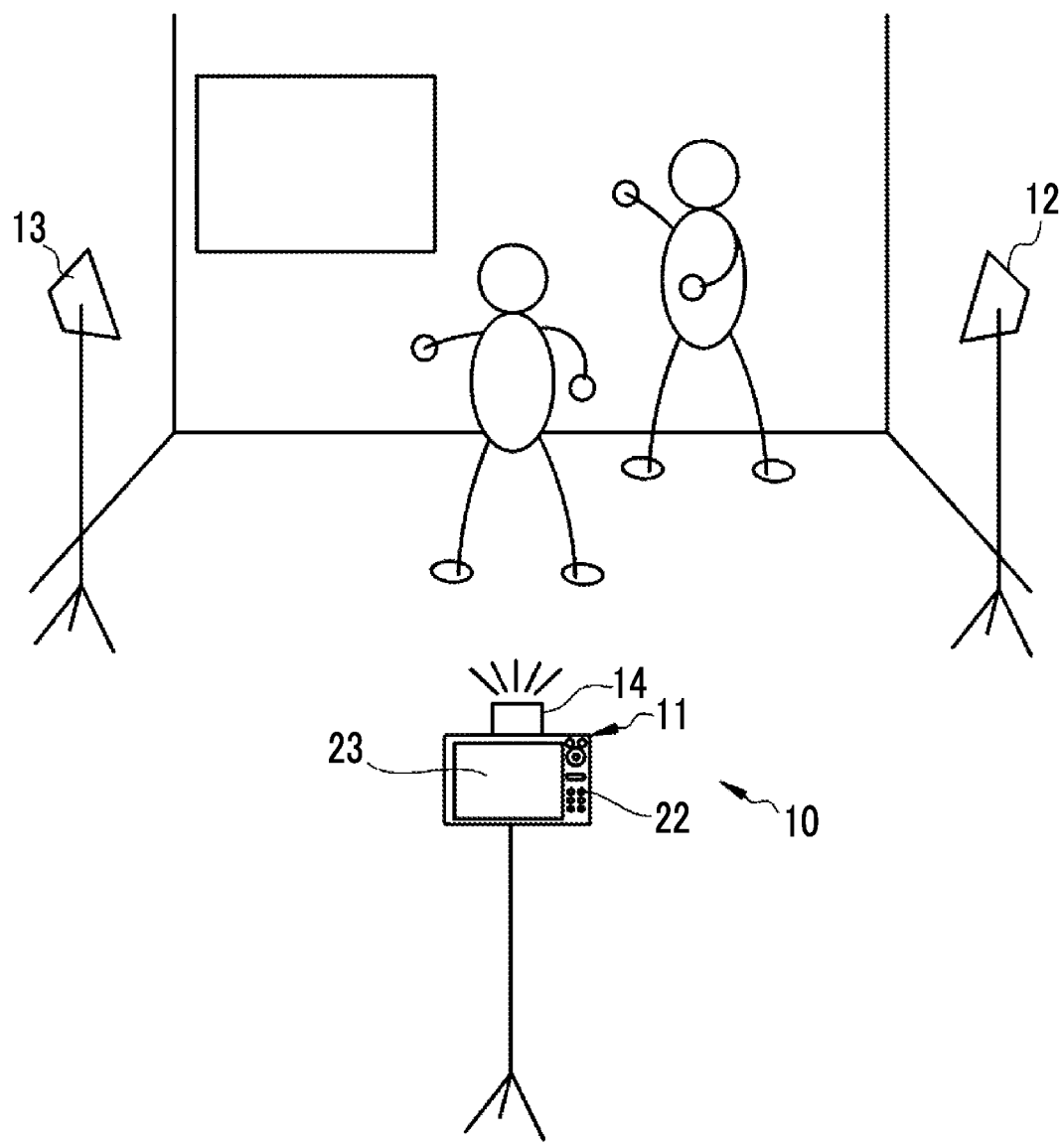
FIG. 1 is a perspective view illustrating the overall configuration of an imaging system to which an embodiment of an imaging support device according to the invention is applied and illustrates a state in which a strobe light emitting unit of a camera is turned on to capture an individual illumination image.

FIG. 1 is a diagram illustrating the overall configuration of an imaging system to which an embodiment of an imaging support device according to the invention is applied. An imaging system 10 is, for example, an imaging system that is used in an imaging studio and can perform plural illumination imaging using a plurality of illuminating devices. The imaging system 10 includes a digital camera (hereinafter, simply referred to as a camera) 11 and two strobe devices 12 and 13. The camera 11 is provided with a strobe device including a strobe light emitting unit 14. The built-in strobe device functions as a first illuminating device in the imaging system 10. The two strobe devices 12 and 13 function as a second illuminating device and a third illuminating device in the imaging system 10, respectively. In a case in which plural illumination imaging is performed in the imaging system 10, the camera 11 transmits control signals to the first to third illuminating devices to control a turn-on time.

Figure 2:
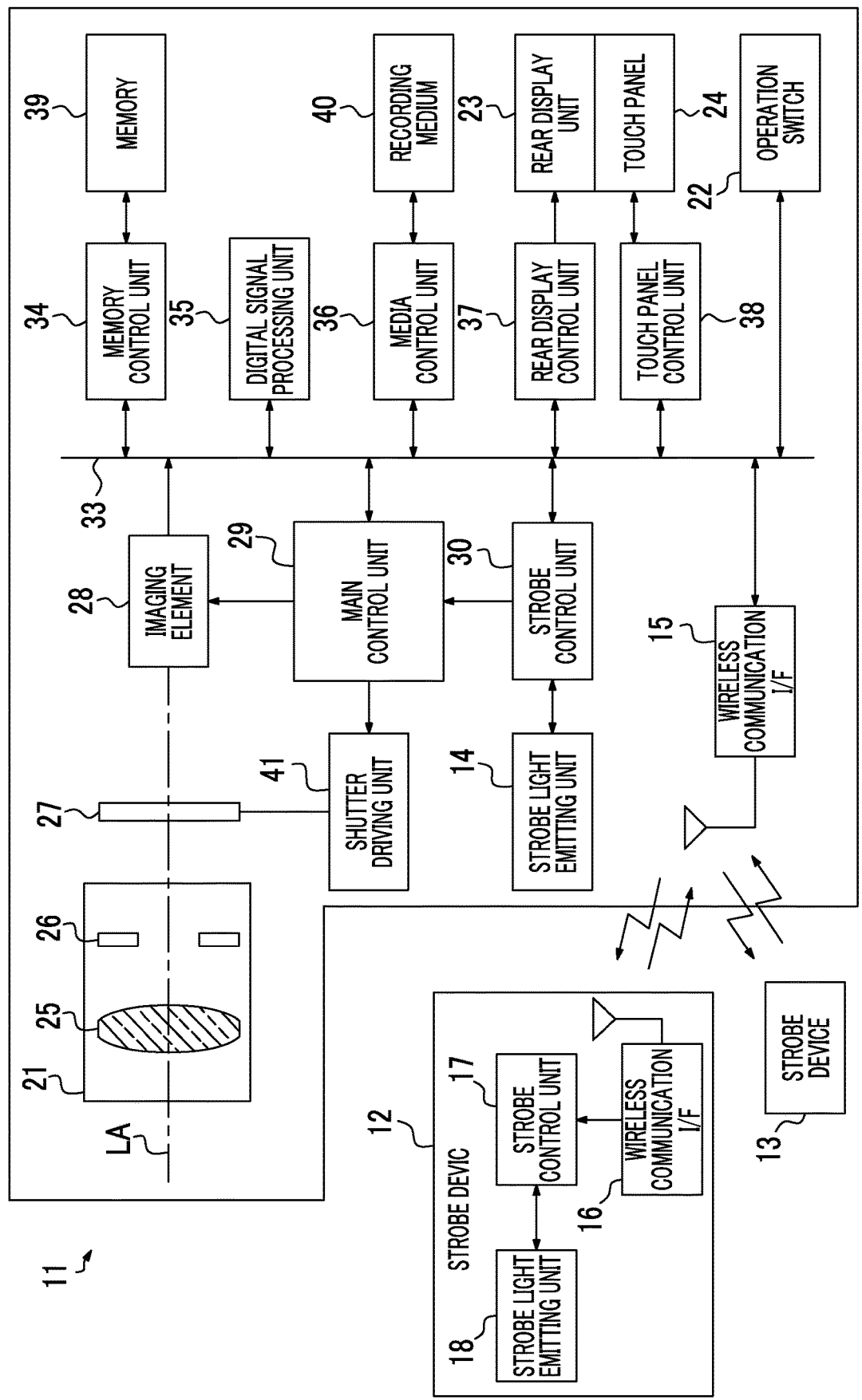
FIG. 2 is a functional block diagram illustrating the camera and strobe devices.

As illustrated in FIG. 2, the camera 11 and the strobe devices 12 and 13 include wireless communication interfaces (I/Fs) 15 and 16 such that the camera 11 and the strobe devices 12 and 13 can perform wireless communication therebetween.

Each of the strobe devices 12 and 13 includes a strobe control unit 17 and a strobe light emitting unit 18 in addition to the wireless communication I/F 16. In a case in which the wireless communication I/F 16 receives a light amount adjustment signal transmitted from the camera 11, the strobe control unit 17 controls the strobe light emitting unit 18 such that the strobe light emitting unit 18 is turned on according to the light amount adjustment signal. Strobe light emitted from the strobe light emitting unit 18 is flash light that is emitted in the order of microseconds. Since the strobe devices 12 and 13 have the same configuration, only the configuration of the strobe device 12 is illustrated in FIG. 2 and the configuration of the strobe device 13 is not illustrated in FIG. 2.

The camera 11 includes, for example, a lens barrel 21, operation switches 22, and a rear display unit 23. The lens barrel 21 is provided on a front surface of a camera body (not illustrated) and holds an imaging optical system 25 or a stop 26.

For example, a plurality of operation switches 22 are provided in an upper part of the camera body or on a rear surface of the camera body. The operation switches 22 receive a turn-on/turn-off operation, a release operation, and an input operation for various settings. The rear display unit 23 is provided on the rear surface of the camera body and displays images acquired in various imaging modes and a menu screen for various settings. A touch panel 24 is provided on the surface of the rear display unit 23. The touch panel 24 is controlled by a touch panel control unit 38. The touch panel control unit 38 transmits a command signal that is input by a touch operation for the touch panel 24 to a main control unit 29.

A shutter 27 and an imaging element 28 are provided in this order behind the imaging optical system 25 and the stop 26 along an optical axis LA of the imaging optical system 25. The imaging element 28 is, for example, a single-chip color complementary metal-oxide-semiconductor (CMOS) image sensor including red, green, and blue (RGB) color filters. The imaging element 28 captures an object image which has been formed on an imaging surface of the imaging optical system 25.

The imaging element 28 includes signal processing circuits (which are not illustrated) such as a noise removal circuit, an auto gain controller, and an analog/digital (A/D) conversion circuit. The noise removal circuit performs a noise removal process for an imaging signal. The auto gain controller amplifies the level of the imaging signal to an optimum value. The A/D conversion circuit converts the imaging signal into a digital signal and outputs the digital signal from the imaging element 28.

The imaging element 28, the main control unit 29, and a strobe control unit 30 are connected to a bus 33. The strobe control unit 30 and the strobe light emitting unit 14 form the built-in strobe device of the camera 11 corresponding to the first illuminating device. In addition, a memory control unit 34, a digital signal processing unit 35, a media control unit 36, a rear display control unit 37, and the touch panel control unit 38 are connected to the bus 33.

A memory 39 for temporary storage, such as a synchronous dynamic random access memory (SDRAM), is connected to the memory control unit 34. The memory control unit 34 inputs image data output from the imaging element 28 to the memory 39 so as to be stored in the memory 39. In addition, the memory control unit 34 outputs the image data stored in the memory 39 to the digital signal processing unit 35.

The digital signal processing unit 35 performs known image processing, such as matrix calculation, a demosaicing process, γ correction, brightness/color difference conversion, and a resizing process, for the image data input from the memory 39 to generate an object image.

The media control unit 36 controls the recording and reading of an image file on and from a recording medium 40. The recording medium 40 is, for example, a memory card having a flash memory provided therein. The media control unit 36 records the image data compressed by the digital signal processing unit 35 on the recording medium 40.

The rear display control unit 37 controls the display of an image on the rear display unit 23. Specifically, the rear display control unit 37 generates a video signal based on, for example, the National Television System Committee (NTSC) standard on the basis of the image data generated by the digital signal processing unit 35 and outputs the video signal to the rear display unit 23.

The main control unit 29 controls an imaging process of the camera 11. Specifically, the main control unit 29 controls the shutter 27 through a shutter driving unit 41 in response to a release operation. The main control unit 29 controls the driving of the imaging element 28 in synchronization with the operation of the shutter 27. The camera 11 can be set to various imaging modes. The main control unit 29 controls, for example, the F-number of the stop 26 and the exposure time of the shutter 27 according to the set imaging mode.

In a case in which plural illumination imaging is performed in the imaging system 10, the camera 11 has an imaging support function that enables a photographer to check an individual irradiation area of each of a plurality of illuminating devices in the imaging range of the imaging element 28. In a case in which an imaging support mode is selected by a mode selection operation, the camera 11 performs an imaging support process. That is, the camera 11 functions as the imaging support device.

Figure 3:
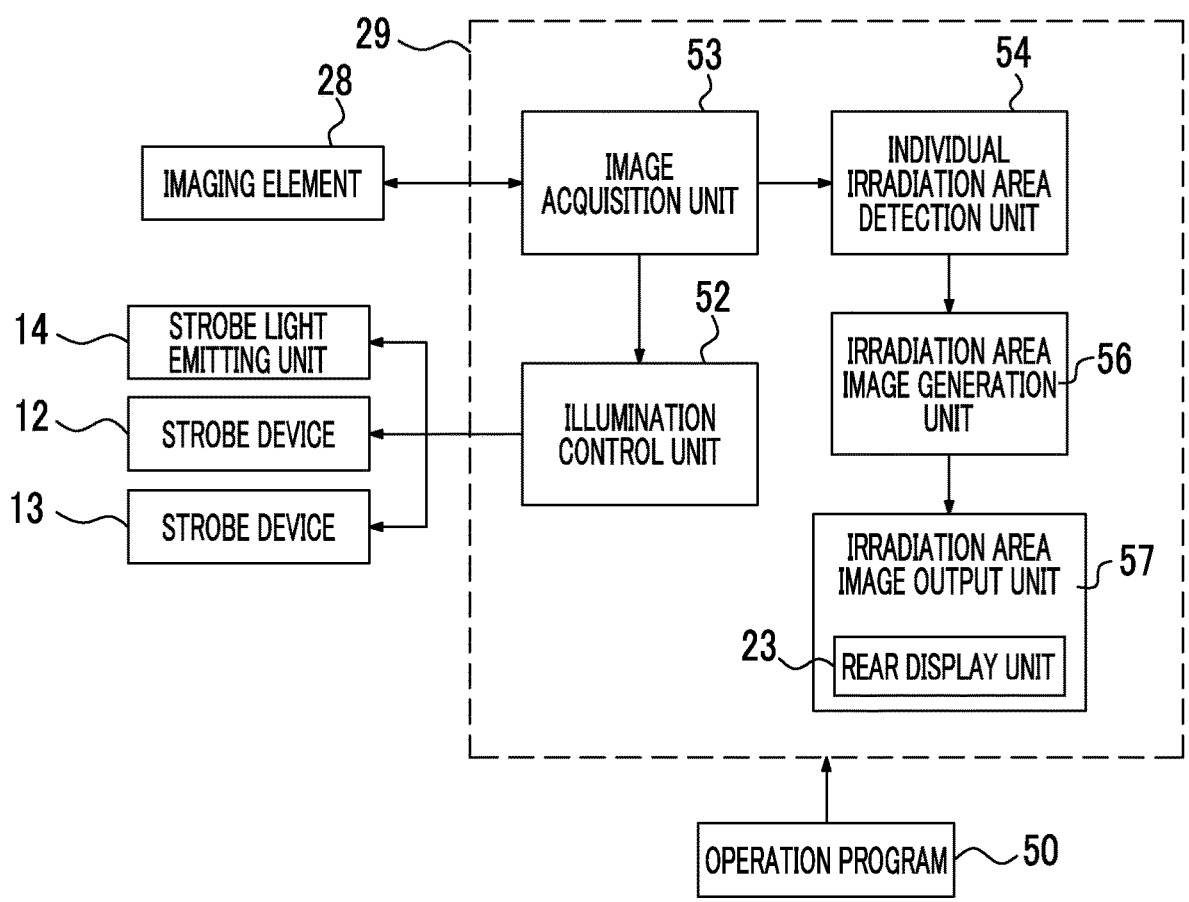
FIG. 3 is a functional block diagram illustrating an imaging support device.

As illustrated in FIG. 3, in the imaging support mode, the main control unit 29 runs an operation program 50 to function as an illumination control unit 52, an image acquisition unit 53, an individual irradiation area detection unit 54, an irradiation area image generation unit 56, and an irradiation area image output unit 57 and performs the imaging support process. The illumination control unit 52, the image acquisition unit 53, the individual irradiation area detection unit 54, the irradiation area image generation unit 56, and the irradiation area image output unit 57 form the imaging support device. The operation program 50 causes the main control unit 29 (computer) of the camera 11 to function as the imaging support device. The operation program 50 is stored in, for example, the memory 39.

The illumination control unit 52 controls the turn-on time and the amount of light of each of the strobe light emitting unit 14 and the strobe devices 12 and 13, which correspond to the first to third illuminating devices illuminating an object, through the strobe control unit 30 or the wireless communication I/F 15.

The image acquisition unit 53 performs an image acquisition step of controlling the imaging element 28 and the illumination control unit 52 such that an image of an object is acquired in the imaging support mode. Specifically, the image acquisition unit 53 selectively turns on the first to third illuminating devices such that the object is selectively irradiated with illumination light from each illuminating device and acquires individual illumination images which are the images of the object individually irradiated with each illumination light component. That is, the individual illumination images are the images of the object captured by using a plurality of illumination light components one by one in the same imaging range. In this example, the image acquisition unit 53 selectively turns on the strobe light emitting unit 14 and the strobe devices 12 and 13 corresponding to the first to third illuminating devices and acquires the individual illumination images of the object individually irradiated with illumination light from the strobe light emitting unit 14, illumination light from the strobe device 12, and illumination light from the strobe device 13. In addition, a plurality of illuminating devices may be selected at the same time, instead of being individually selected as described above. In this case, the selected plurality of illuminating devices function as one illuminating device.

Figure 4:
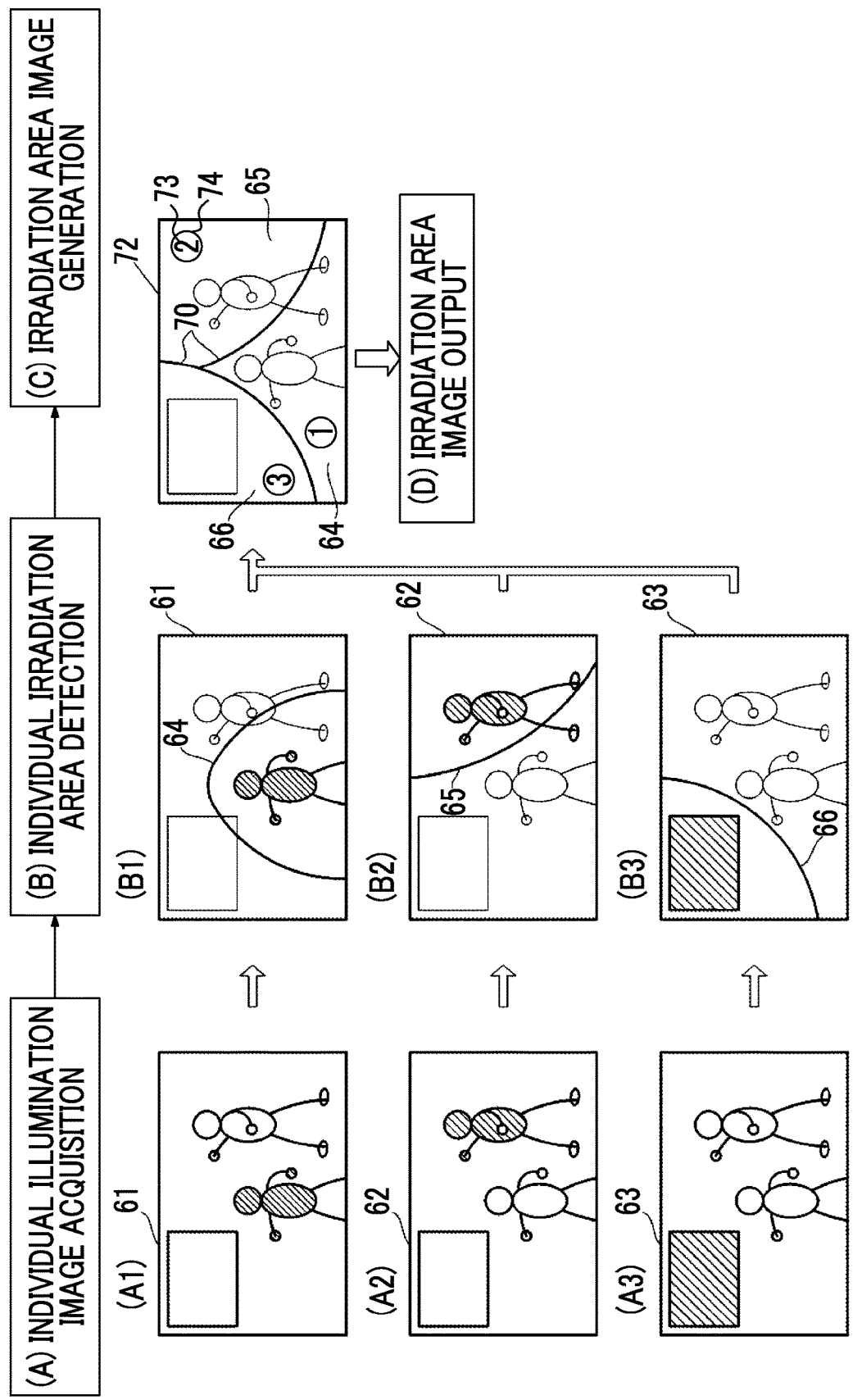
FIG. 4 is a diagram illustrating the outline of an imaging support process.
Figure 5:
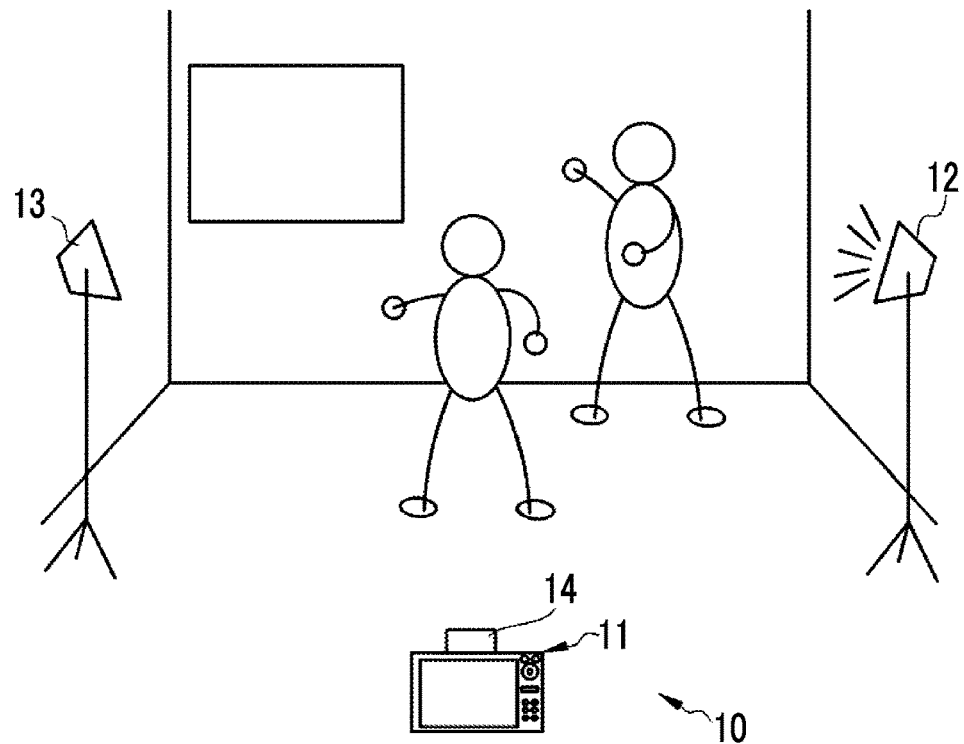
FIG. 5 is an overall perspective view illustrating a state in which a second strobe device is turned on to capture an individual illumination image.
Figure 6:
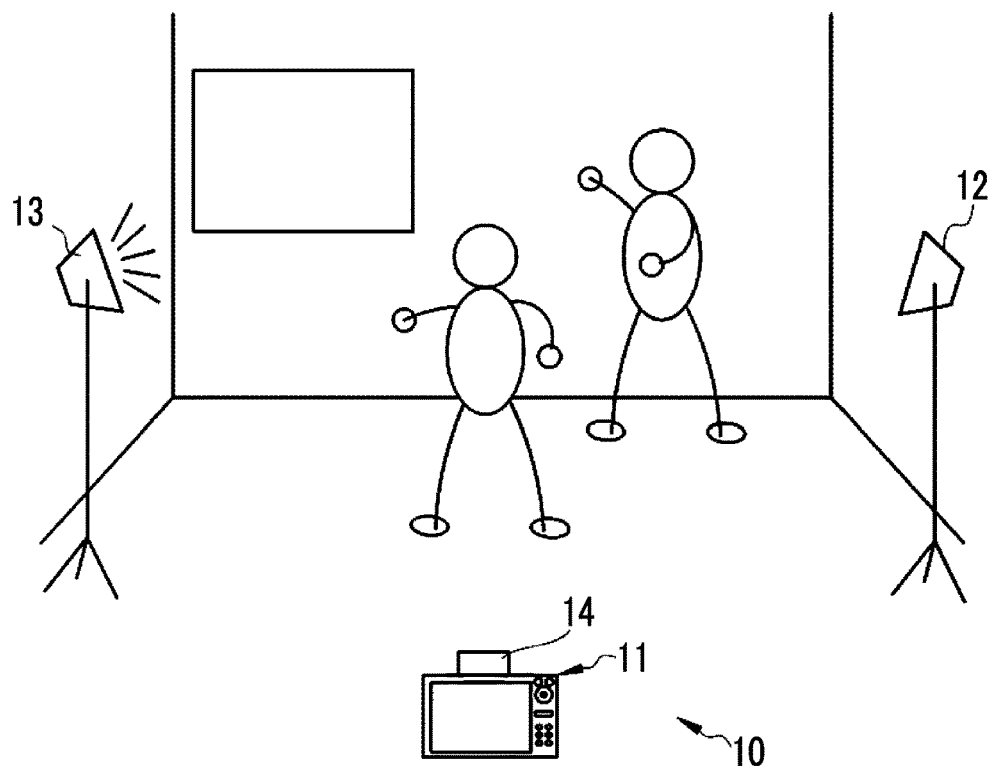
FIG. 6 is an overall perspective view illustrating a state in which a third strobe device is turned on to capture an individual illumination image.

As illustrated in FIG. 4 illustrating the outline of the imaging support process, in (A) an individual illumination image acquisition process performed by the image acquisition unit 53, individual illumination images 61 to 63 corresponding to each illumination light component are acquired. First, the individual illumination image 61 in (A1) is an image of the object acquired by the imaging element 28 in a state in which only the strobe light emitting unit 14 of the camera 11 is turned on as illustrated in FIG. 1. The individual illumination image 62 in (A2) is an image of the object acquired by the imaging element 28 in a state in which only the strobe device 12 is turned on as illustrated in FIG. 5. The individual illumination image 63 in (A3) is an image of the object acquired by the imaging element 28 in a state in which only the strobe device 13 is turned on as illustrated in FIG. 6.

In a case in which the image acquisition unit 53 acquires the individual illumination image 61, the image acquisition unit 53 controls an imaging process in association with the illumination control unit 52 such that the turn-on time of the built-in strobe device is synchronized with the imaging time of the imaging element 28. In a case in which the individual illumination image 62 or the individual illumination image 63 is acquired, the illumination control unit 52 wirelessly communicates with the strobe device 12 or the strobe device 13 to control the turn-on time of the strobe device 12 or the strobe device 13. The image acquisition unit 53 controls an imaging process in association with the illumination control unit 52 such that the turn-on time of the strobe device 12 or the strobe device 13 is synchronized with the imaging time of the imaging element 28. Each of the individual illumination images 61 to 63 is acquired by the above-mentioned imaging process.

The individual irradiation area detection unit 54 performs an individual irradiation area detection step of performing (B) an individual irradiation area detection process in FIG. 4. The individual irradiation area detection process detects individual irradiation areas which are areas irradiated with each illumination light component in the imaging range of the imaging element 28 on the basis of the plurality of individual illumination images 61 to 63 acquired by the image acquisition unit 53. In this example, the individual irradiation area is an area with a relatively high brightness in each of the individual illumination images 61 to 63.

In a case in which plural illumination imaging is performed, the individual irradiation area of each illuminating device in the imaging range varies depending on, for example, the position, irradiation direction, and/or irradiation range of the illuminating device. For example, as illustrated in FIG. 4, the brightness of the center of the imaging range is relatively high in the individual illumination image 61. The brightness of the right side of the imaging range is relatively high in the individual illumination image 62. The brightness of the left side of the imaging range is relatively high in the individual illumination image 63.

Specifically, the individual irradiation area detection unit 54 compares the brightness values of all pixels of the individual illumination image 61 and extracts a pixel having a brightness value difference greater than a predetermined value as a high-brightness pixel with a relatively high brightness. This is because the difference between the brightness value of a pixel irradiated with high-intensity illumination light and the brightness values of other pixels is considered to be greater than the predetermined value. A predetermined range in which the extracted high-brightness pixels are collectively present is detected as the individual irradiation area of the individual illumination image 61. The same process as described above is performed for the individual illumination images 62 and 63 to detect the individual irradiation areas of the individual illumination images 62 and 63. The individual irradiation area detection unit 54 outputs the information of the detected individual irradiation areas as the coordinate information of each individual illumination image.

The irradiation area image generation unit 56 performs an irradiation area image generation step of performing (C) an irradiation area image generation process in FIG. 4. The irradiation area image generation process generates an irradiation area image 72 in which division marks indicating individual irradiation areas 64 to 66 detected by the individual irradiation area detection unit 54 are inserted into the image of the object.

The image of the object into which the display marks are inserted is an image that is captured in the same imaging range as the individual illumination images 61 to 63 and is, for example, a preview image (also referred to as a live image or a through-image) output by the imaging element 28 before a main imaging operation. The irradiation area image generation unit 56 inserts division lines 70 as the division marks into the preview image which is the image of the object, on the basis of the coordinate information of the individual irradiation areas 64 to 66 output by the individual irradiation area detection unit 54.

In some cases, the individual irradiation areas 64 to 66 partially overlap each other. In this case, for example, the division line 70 is inserted into the position of the center at which the overlap portion is divided into two equal parts. As a method for determining the division line 70 in the overlap portion, for example, another method may be used which determines the position of the division line 70 such that a region of the individual irradiation area with a relatively high brightness is widened. The irradiation area image 72 in which the division marks indicating the individual irradiation areas 64 to 66 are inserted is generated by this process.

In addition, the irradiation area image generation unit 56 inserts identification symbols 73 into the divided individual irradiation areas 64 to 66 in the irradiation area image 72. The identification symbols 73 are identification symbols for identifying the individual irradiation areas 64 to 65 and are identification symbols for identifying the illuminating devices corresponding to the individual irradiation areas 64 to 65.

In this embodiment, the strobe device provided in the camera 11 is the first illuminating device, the strobe device 12 is the second illuminating device, and the strobe device 13 is the third illuminating device. In correspondence with this configuration, "1" is used as the identification symbol 73 of the individual irradiation area 64 corresponding to the first illuminating device, "2" is used as the identification symbol 73 of the individual irradiation area 65 corresponding to the second illuminating device, and "3" is used as the identification symbol 73 of the individual irradiation area 66 corresponding to the third illuminating device. In FIG. 4, the identification symbol 73 is displayed as, for example, a circled number surrounded by a circular frame 74.

For example, in a case in which a number is given to each illuminating device in an imaging studio, the number is used as the identification symbol 73. With this configuration, the illuminating devices are identified only by checking the identification symbols 73 in the individual irradiation areas 64 to 66. Therefore, it is easy to specify the illuminating devices.

The irradiation area image output unit 57 performs an irradiation area image output step of displaying the irradiation area image 72 generated by the irradiation area image generation unit 56 on the rear display unit 23. Therefore, the photographer can check the irradiation area image 72. In addition, since the irradiation area image 72 is a preview image, the irradiation area image 72 enables the photographer to check the amount of light of each of the individual irradiation areas 64 to 66 in the imaging range. In a case in which the amount of light of each illuminating device is adjusted, the adjusted amount of light is reflected in the irradiation area image 72 in real time. The amount of illumination light of each illuminating device is adjusted to achieve delicate expression intended by the photographer, such as the shading and texture of the object, in the captured image.

Figure 7:
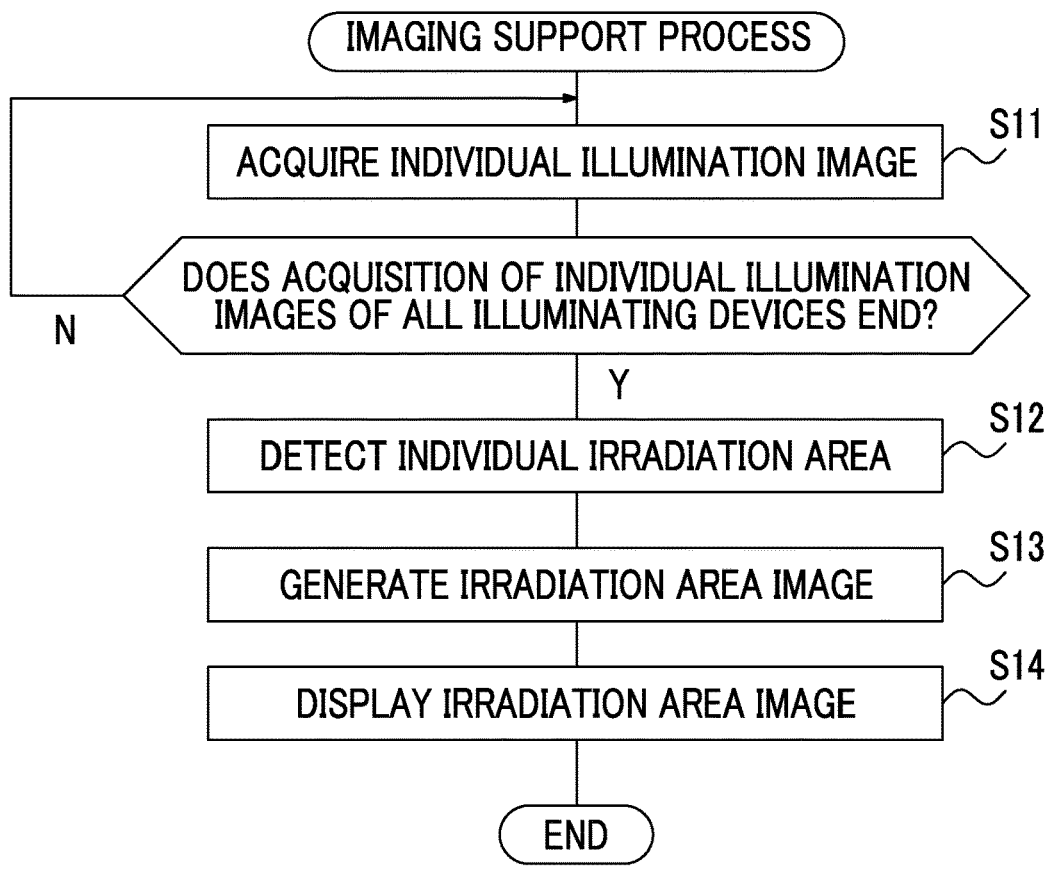
FIG. 7 is a flowchart illustrating the imaging support process.

Next, the operation of the first embodiment will be described with reference to the flowchart illustrated in FIG. 7. In a case in which the imaging support mode is selected in the camera 11, the imaging support process is performed. In the imaging support process, first, the image acquisition unit 53 performs the individual illumination image acquisition process (S11). In the individual illumination image acquisition process, as illustrated in FIGS. 1, 5, and 6, the strobe light emitting unit 14 and the strobe devices 12 and 13 corresponding to the first to third illuminating devices are selectively turned on in this order to individually emit each illumination light component. In this state, the imaging element 28 performs an imaging process. Then, the image acquisition unit 53 acquires the individual illumination images 61 to 63 illustrated in (A1), (A2), and (A3) of FIG. 4.

Then, the individual irradiation area detection unit 54 performs the individual irradiation area detection process on the basis of the acquired individual illumination images 61 to 63 (S12). In a case in which the individual irradiation area detection process is performed, the individual irradiation areas 64 to 66 are detected from the individual illumination images 61 to 63. The individual irradiation area detection unit 54 outputs the coordinate information of the detected individual irradiation areas 64 to 66 to the irradiation area image generation unit 56. Then, the irradiation area image generation unit 56 performs the irradiation area image generation process (S13). In the irradiation area image generation process, the division line 70 indicating the division mark is inserted into the image of the object on the basis of the coordinate information of the detected individual irradiation areas 64 to 66 to generate the irradiation area image 72.

The irradiation area image 72 is displayed on the rear display unit 23 of the camera 11 (S14). The photographer observes the irradiation area image 72 to simply check each individual irradiation area in the imaging range.

In order to achieve delicate expression intended by the photographer, such as the shading and texture of the object, in the captured image of the object, the amounts of illumination light components are actually adjusted to appropriately adjust the amount of each illumination light component. In a case in which plural illumination imaging is performed, it is necessary to check the position of the individual irradiation area of each illuminating device in the imaging range of the camera 11 on the premise that the amount of light of each illuminating device is adjusted. The irradiation area image 72 makes it possible to simply check the position of the individual irradiation areas 64 to 66 of each illuminating device.

This configuration makes it possible to simply check the relationship between a portion whose amount of light is to be adjusted in the imaging range and the illuminating device whose amount of light is to be adjusted. The photographer adjusts the amount of illumination light of each of the first to third illuminating devices on the basis of the irradiation area image 72 (increases or decreases the amount of light) to adjust, for example, the shading and texture of the object. Since the irradiation area image 72 is a preview image, the adjusted amount of light is reflected in the irradiation area image 72 in real time. The photographer can readjust the amount of light if necessary while seeing the irradiation area image 72.

In a case in which there are many illuminating devices as in an imaging studio, the illuminating devices are located at various positions or emit light in various directions. Therefore, it takes a lot of time and effort to check the individual irradiation areas. However, the configuration in which the irradiation area image 72 is displayed as in the imaging system 10 can reduce the time and effort to check the individual irradiation areas. As such, since the appropriate adjustment of the amount of light is simply performed, it is possible to simply achieve delicate expression intended by the photographer in the captured image. In addition, since the identification symbols 73 of the individual irradiation areas 64 to 66 are attached to the irradiation area image 72, it is easy to specify the illuminating devices corresponding to the individual irradiation areas 64 to 66.

Modification Example 1

Figure 8:
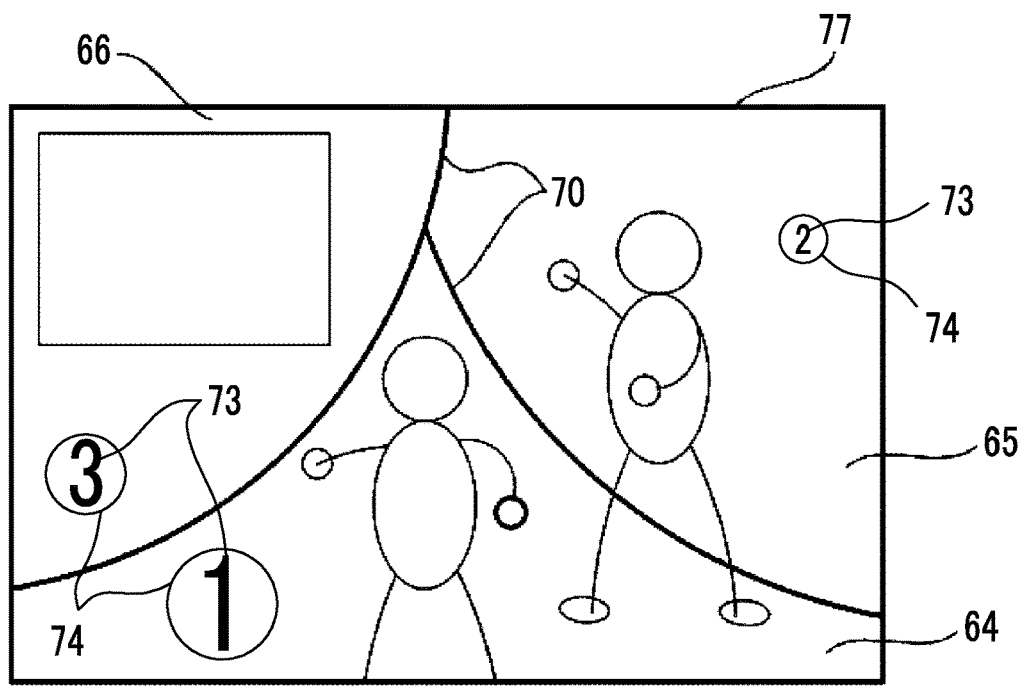
FIG. 8 is a front view illustrating an irradiation area image in Modification Example 1 in which the display size of an identification symbol is changed depending on the magnitude of the brightness of each individual irradiation area.

As illustrated in FIG. 8, the irradiation area image generation unit 56 may compare the brightnesses of the individual illumination images 61 to 63 and display the magnitude relationship between the brightnesses of the individual irradiation areas 64 to 66 in an irradiation area image 77. For example, the magnitude relationship is represented by changing the display size of the identification symbol 73 depending on the magnitude of the brightnesses of the individual irradiation areas 64 to 66. For example, in a case in which the individual irradiation area 64 has the highest brightness, the individual irradiation area 66 has the second highest brightness, and the individual irradiation area 65 has the lowest brightness, for the display size of the identification symbol 73 inserted into each of the individual irradiation areas 64 to 66. "1" indicates a large size. "3" indicates a medium size, and "2" indicates a small size. These identification symbols 73 are values corresponding to the comparison results of the brightnesses of the individual irradiation areas 64 to 66. This configuration makes it possible to simply recognize the magnitude relationship between the brightnesses of the individual irradiation areas 64 to 66.

Modification Example 2

Figure 9:
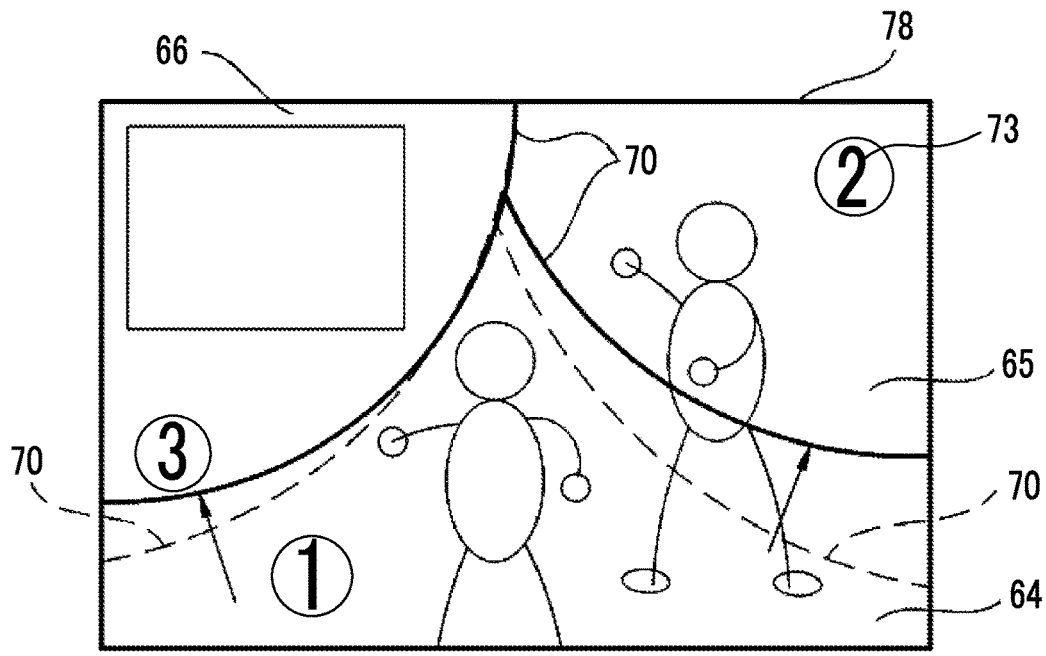
FIG. 9 is a front view illustrating an irradiation area image in Modification Example 2 in which the size of the individual irradiation area is changed depending on the magnitude of the brightness of each individual irradiation area.

As illustrated in an irradiation area image 78 according to Modification Example 2 illustrated in FIG. 9, the magnitude relationship between brightnesses may be represented by the sizes (areas) of the individual irradiation areas 64 to 66. In FIG. 9, a dotted division line 70 indicates the same position as that of the irradiation area image 77 illustrated in FIG. 8 and a solid division line 70 is a division line in which the magnitude relationship between the brightnesses is reflected and is changed. Both the dotted division line 70 and the solid division line 70 are displayed in the irradiation area image 78. In this way, the size of each of the individual irradiation areas 64 to 66 is changed depending on the brightness. According to Modification Example 2, it is possible to easily recognize the magnitude relationship between the brightnesses from the magnitude of the areas of the individual irradiation areas 64 to 66.

The magnitude relationship between the brightnesses of the individual irradiation areas 64 to 66 may be represented by values corresponding to the brightnesses of the individual irradiation areas 64 to 66. The values corresponding to the brightnesses are, for example, the brightness values of the individual irradiation areas 64 to 66. The magnitude relationship between the brightnesses is represented by the values corresponding to the comparison results of the brightnesses of the individual irradiation areas 64 to 66 in Modification Example 1 illustrated in FIG. 8 and the magnitude relationship between the brightnesses is represented by the sizes of the individual irradiation areas 64 to 66 in the irradiation area image 78 in Modification Example 2 illustrated in FIG. 9. However, Modification Example 1 illustrated in FIG. 8 and Modification Example 2 illustrated in FIG. 9 may be combined with each other. That is, the magnitude relationship between the brightnesses may be represented by at least one of the sizes of the individual irradiation areas in the irradiation area image, the values corresponding to the brightnesses of the individual irradiation areas, or the comparison results of the brightnesses of the individual irradiation areas.

Second Embodiment

Figure 10:
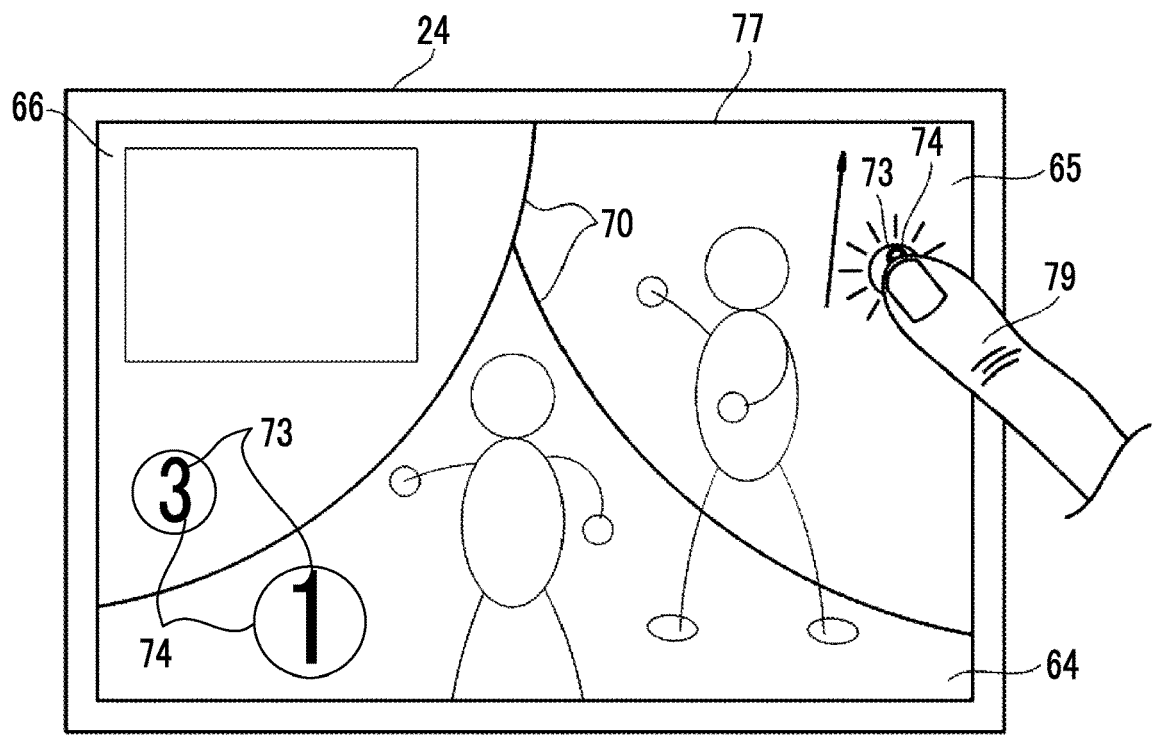
FIG. 10 is a front view illustrating a touch panel screen showing an example of a touch panel operation in a second embodiment.

In a second embodiment, in order to use the individual irradiation areas 64 to 66 checked by the first embodiment as operation input receiving areas, the amount of adjustment of the amount of light can be input by the touch panel 24 as an operation input receiving unit. As illustrated in FIG. 10, the irradiation area image 77 illustrated in FIG. 8 is displayed on a screen of the touch panel 24. The individual irradiation areas 64 to 66 divided by the division lines 70 are set as the operation input receiving areas in the touch panel 24.

In a case in which the identification symbol 73 of the individual irradiation area 65 corresponding to the illuminating device whose amount of light is desired to be adjusted is tapped with, for example, a finger 79 (the screen is lightly struck with a finger tip), for example, the tapped identification symbol 73 is displayed so as to be blinked. After the blinking display, the photographer moves (swipes) the finger 79 touched the blinking identification symbol 73 upward to input the amount of adjustment for increasing the amount of light. In this case, the amount of adjustment of the amount of light is increased or decreased according to a slide distance by swiping. In addition, the photographer swipes the finger downward to input a signal for reducing the amount of light. For example, since a known method is used to input the amounts of control corresponding to various operations through the touch panel 24, the detailed description thereof will not be repeated.

Figure 11:
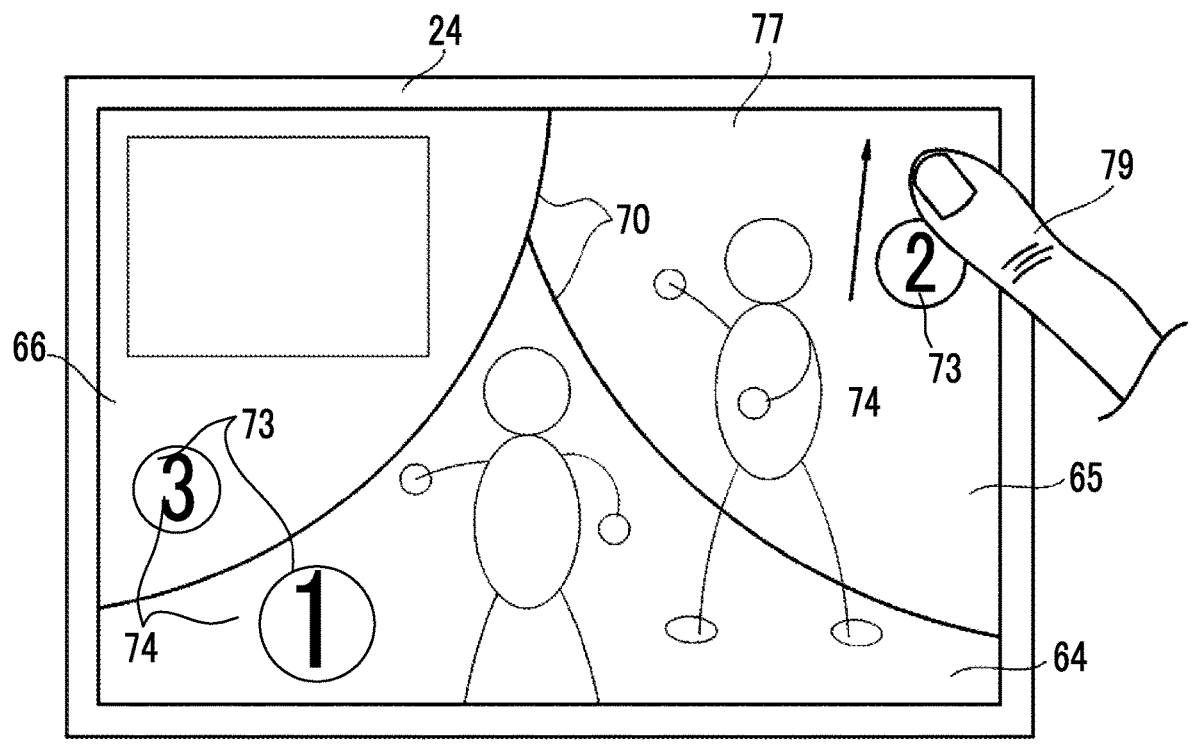
FIG. 11 is a front view illustrating a touch panel screen after a touch operation is input.

In a case in which the input of the amount of adjustment of the amount of light by a slide operation is completed, for example, the sizes of the identification symbol 73 and the frame 74 are changed according to the input amount of adjustment of the amount of light and the identification symbol 73 and the frame 74 with the sizes corresponding to the controlled brightness are displayed as illustrated in FIG. 11. Therefore, the photographer can check the sizes of the identification symbol 73 and the frame 74 and input the amount of adjustment of the amount of light most suitable for each illuminating device. In this embodiment, the identification symbol is simply changed to the size corresponding to the controlled brightness. However, instead of or in addition to this configuration, the input amount of adjustment of the amount of light may be displayed as a value. In addition, an image in an individual irradiation area 68 may be corrected to an image subjected to light amount correction corresponding to the amount of adjustment of the amount of light on the basis of the amount of control and the corrected image may be displayed in the individual irradiation area 68. Since the detailed description of a method for creating a light-amount-corrected image is disclosed in, for example, JP2007-281937A, the detailed description of the method will not be repeated. In this case, it is easy to check a final image after the amount of adjustment of the amount of light is input.

Figure 12:
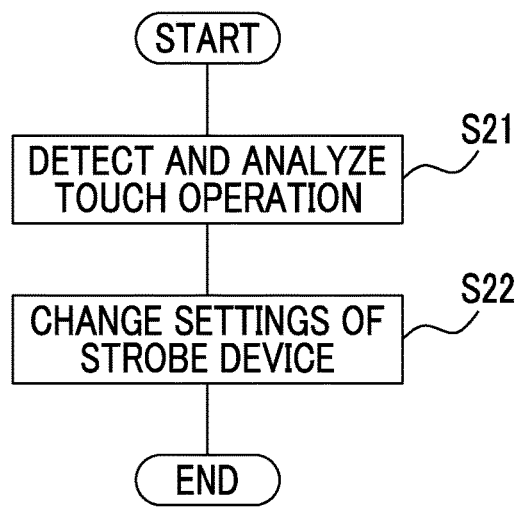
FIG. 12 is a flowchart illustrating the process procedure of a touch panel operation.

A flowchart according to the second embodiment is illustrated in FIG. 12. First, a touch operation is detected and analyzed (S21) and the amounts of control of the strobe devices are determined by the operations illustrated in FIGS. 10 and 11. The amounts of control of the strobe devices are transmitted to the illumination control unit 52 (see FIG. 3) and the settings of the strobe devices are changed (S22). In the change of the settings of the strobe devices, for example, the illumination control unit 52 transmits a light amount adjustment signal for increasing or decreasing the amount of strobe light to the strobe devices corresponding to each individual irradiation area input by the touch operation such that the amount of light emitted from each strobe device is reset. In the main imaging operation, each strobe device is turned on under the reset conditions and it is possible to perform imaging in a desired light control state.

Modification Example 3

Figure 13:
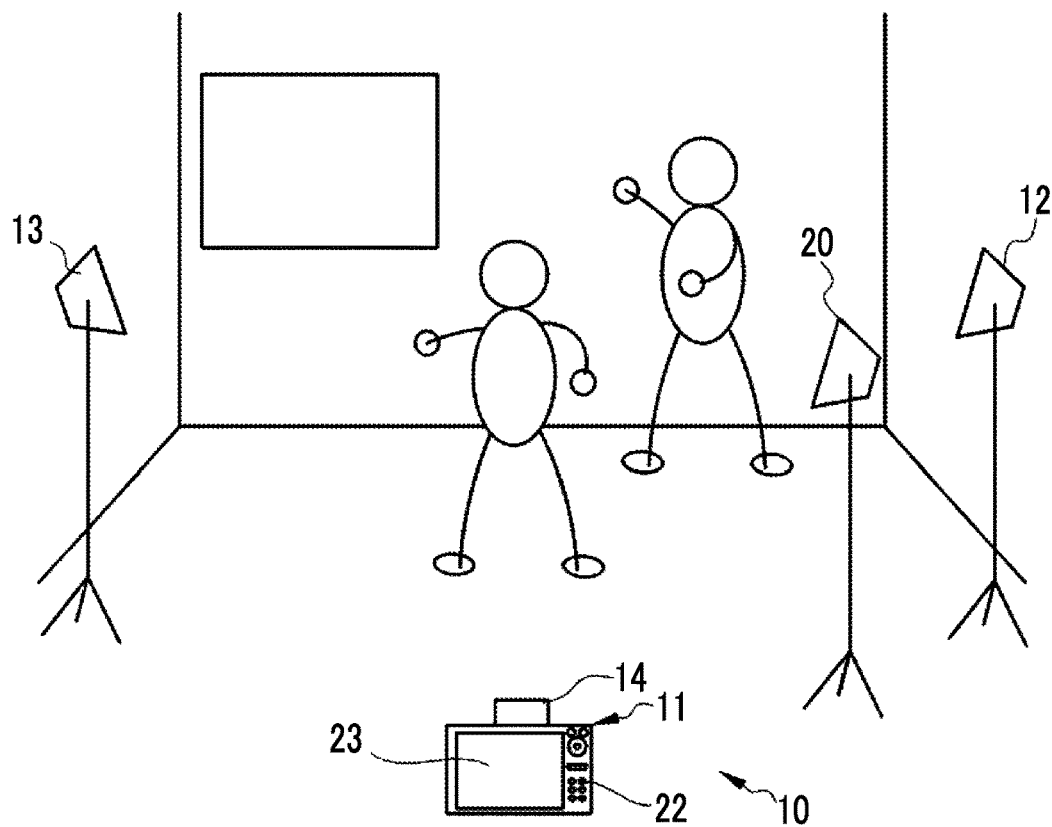
FIG. 13 is a perspective view illustrating the overall configuration of an imaging system in which the number of strobe devices increases.
Figure 14:
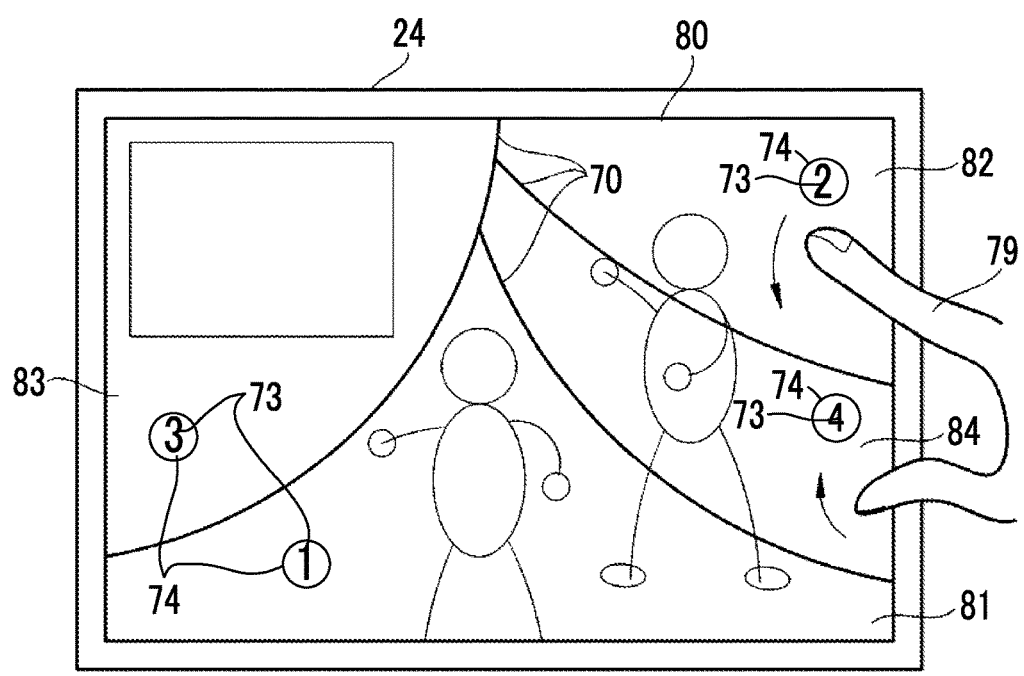
FIG. 14 is a front view illustrating a touch panel screen showing the integration of a plurality of individual irradiation areas by a pinch operation.
Figure 15:
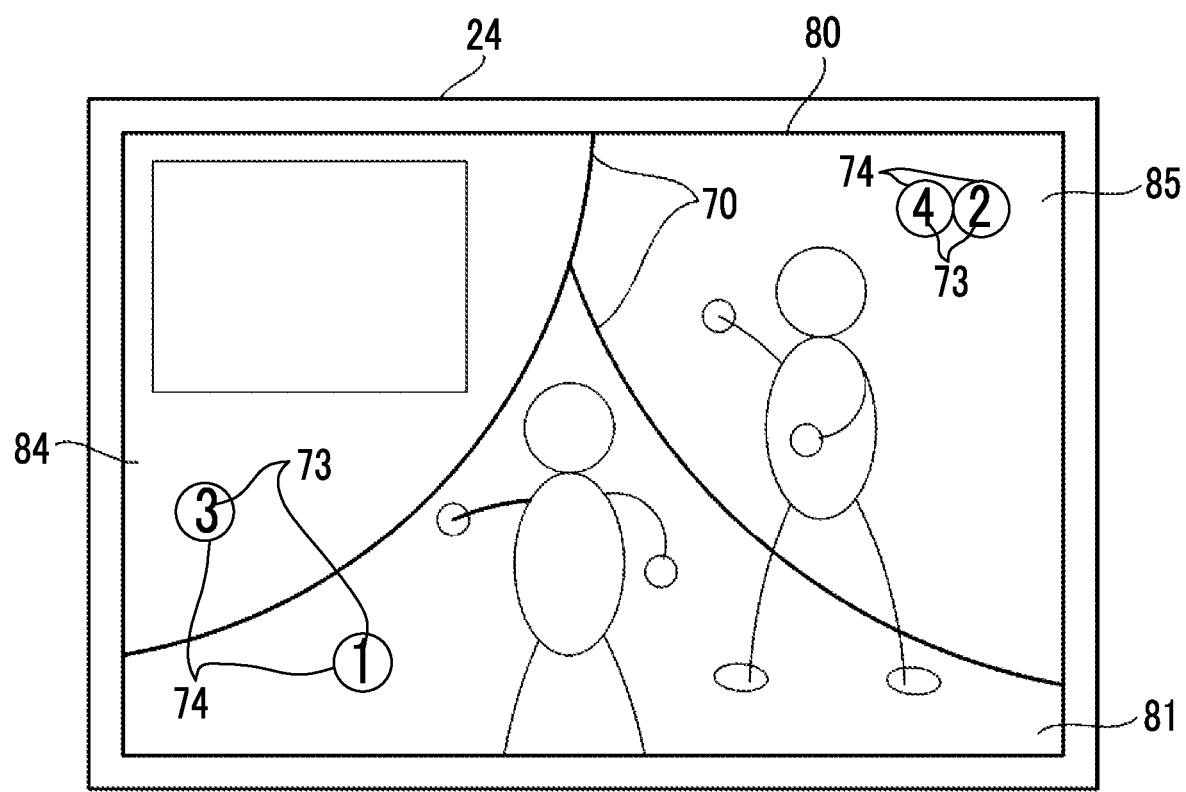
FIG. 15 is a front view illustrating a touch panel screen after the individual irradiation areas are integrated.

In the display of the irradiation area image by the touch panel 24, as illustrated in FIGS. 13 to 15, for example, an individual irradiation area 84 generated by a strobe device 20 as a fourth illuminating device which is provided so as to be adjacent to the strobe device 12 may be integrated with other individual irradiation areas 81 to 83 by a pinch operation. In Modification Example 3, for example, the same components as those in the first embodiment are denoted by the same reference numerals and the description thereof will not be repeated.

An imaging system 10 illustrated in FIG. 13 differs from the imaging system 10 illustrated in FIG. 1 in that the fourth strobe device 20 is provided so as to be adjacent to the left side of the second strobe device 12. The two strobe devices 12 and 20 that are provided so as to be adjacent to each other are controlled at the same time rather than individually controlled for good light control for all illuminating devices. In this case, two strobe devices 12 and 20 can be collectively controlled as one illuminating device by a pinch operation. On the contrary, an operation of spreading two fingers apart, with two fingers touched the screen in the integrated individual irradiation area, may be performed to return the integrated individual irradiation area to two original individual irradiation areas.

FIG. 14 illustrates the touch panel 24 on which an irradiation area image 80 formed by four illuminating devices (the strobe light emitting unit 14 and the strobe devices 12, 13, and 20) is displayed. The irradiation area image 80 is divided into four individual irradiation areas 81 to 84 corresponding to the four illuminating devices and is displayed. In this case, for example, in a case in which the photographer wants to integrate the second individual irradiation area 82 and the fourth individual irradiation area 84, the photographer performs a pinch operation of touching the two areas 82 and 84 with two fingers 79 and pinching the two areas 82 and 84 with the two fingers 79. Then, as illustrated in FIG. 15, the second individual irradiation area 82 and the fourth individual irradiation area 84 are integrated into an integrated area 85 and the integrated area 85 is displayed. In the integrated area 85, the identification symbols 73 of the second individual irradiation area 82 and the fourth individual irradiation area 84 are displayed side by side. For the integrated area 85, for example, the same amount of adjustment of the amount of light is collectively input to the strobe devices 12 and 20. The application of the integration operation is not limited to adjacent illuminating devices and the illuminating devices that are separated from each other may be integrated by a pinch operation.

Third Embodiment

Figure 17:
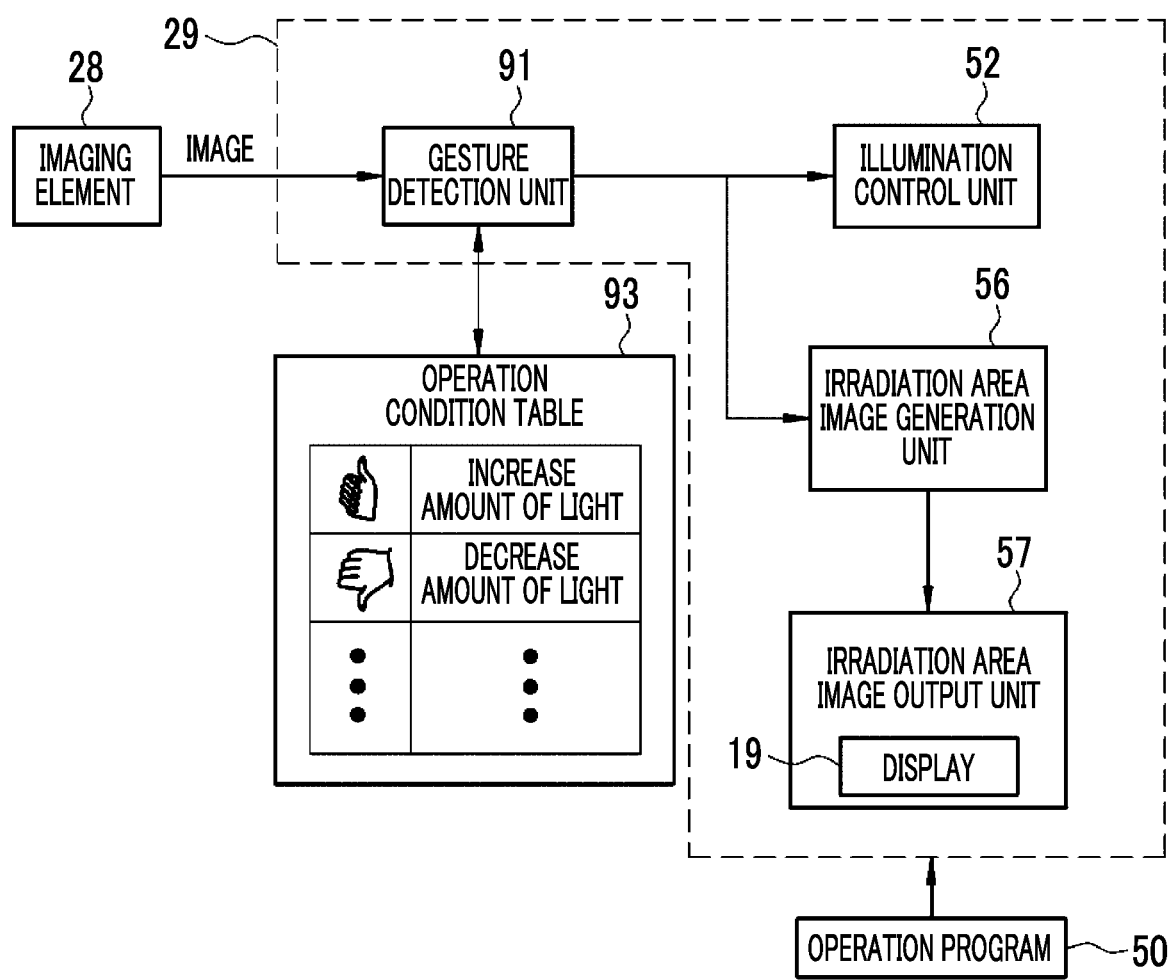
FIG. 17 is a functional block diagram for inputting a gesture.

As illustrated in FIGS. 16 to 19, in a third embodiment, instead of or in addition to the input of the amount of adjustment of the amount of light by the touch panel 24 as in the second embodiment, the gesture of a photographer 90 who stands instead at the position of a model 89 is detected and the amount of adjustment of the amount of light is input. In this case, as illustrated in FIG. 16, a display 19 is provided in the imaging system 10 illustrated in FIG. 1, with a display screen facing an object. In addition, the main control unit 29 runs the operation program 50 to function as a gesture detection unit 91 as an operation input receiving unit, the illumination control unit 52, the irradiation area image generation unit 56, and the irradiation area image output unit 57, as illustrated in FIG. 17, and performs a gesture input process. In the third embodiment, the same components as those in the first and second embodiments are denoted by the same reference numerals. In the invention, the term "gesture" means a motion of the limbs and body indicating the operator's will on operation. The gesture is detected by the gesture detection unit 91.

Figure 18:
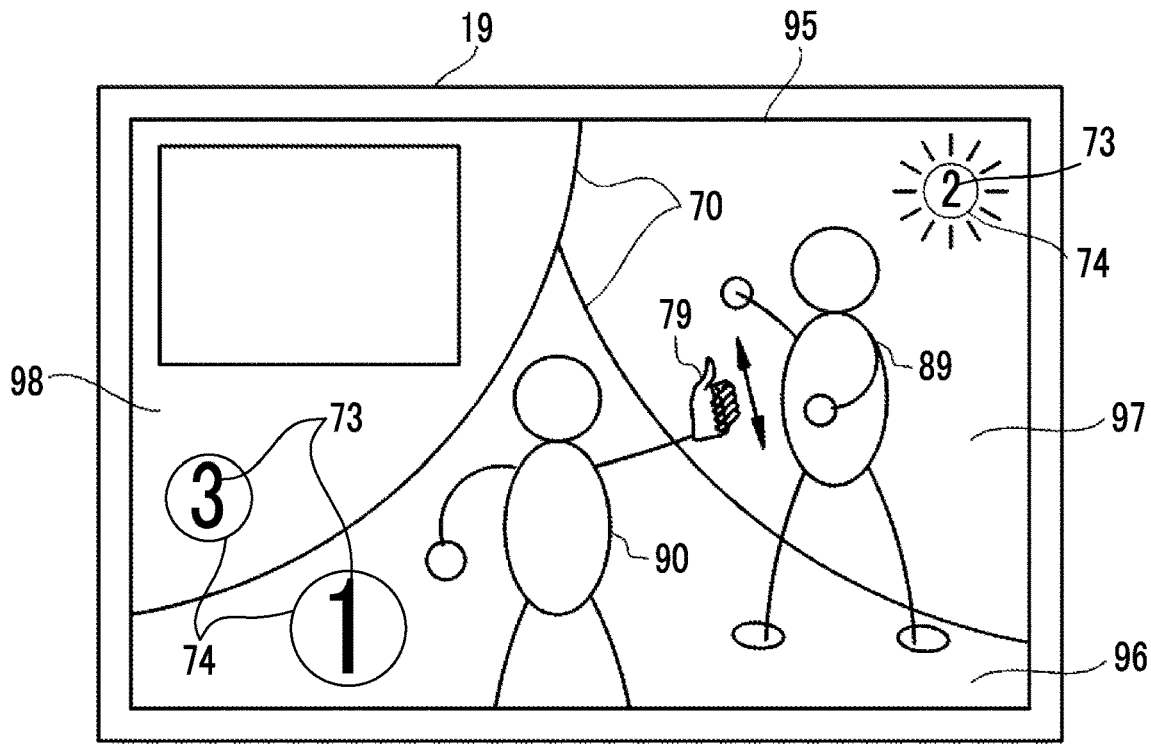
FIG. 18 is a front view illustrating an example of a display screen showing a state in which the specification of an individual irradiation area and the input of the amount of adjustment of the amount of light are performed by a gesture.

FIG. 18 illustrates an example of an irradiation area image 95 displayed on the display 19. In the irradiation area image 95, a plurality of individual irradiation areas 96 to 98 are allocated as gesture detection areas. The gesture detection area is an area for detecting the gesture as an operation input for each illuminating device. The illuminating device whose amount of light is to be adjusted is specified on the basis of the gesture detection area in which a gesture is detected among the gesture detection areas. In the irradiation area image 95, the identification symbol 73 of the individual irradiation area including the finger 79 of the photographer 90 is displayed in a different aspect from the identification symbols 73 of the other individual irradiation areas. For example, the identification symbol 73 is displayed so as to be blinked. FIG. 18 illustrates a case in which the finger 79 of the photographer 90 is present in the individual irradiation area 97 and an illuminating device corresponding to the individual irradiation area 97 is specified as the illuminating device whose amount of light is to be adjusted.

Figure 19:
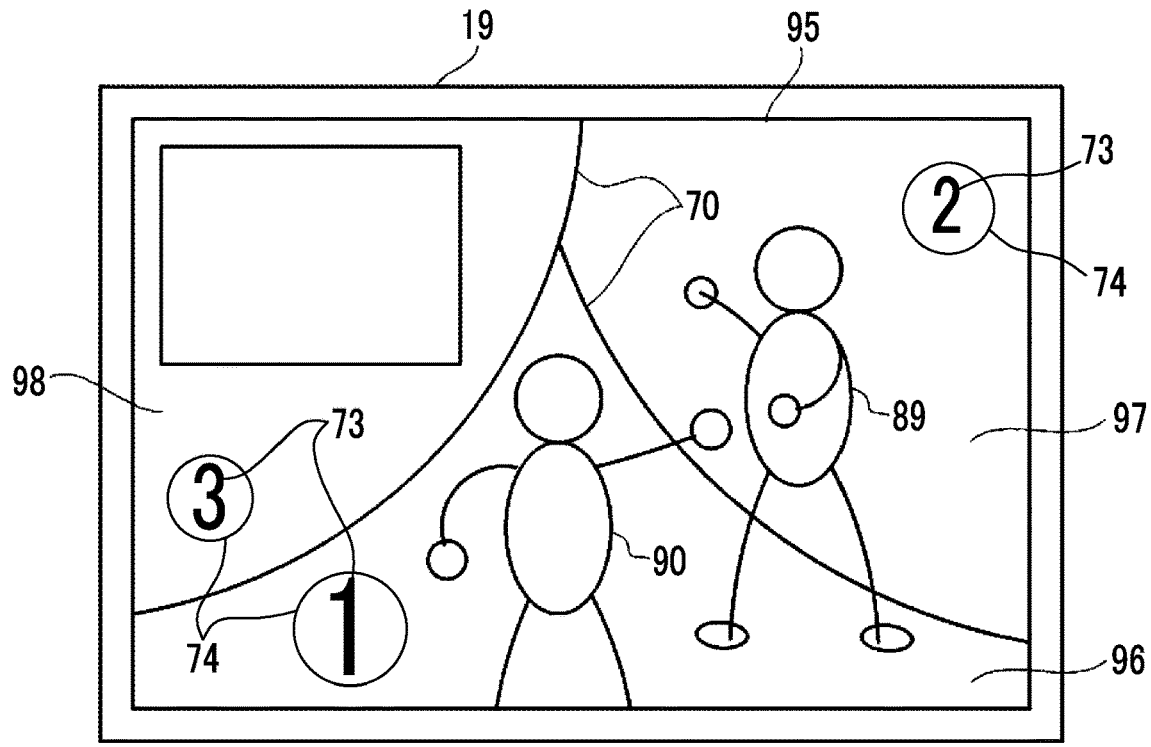
FIG. 19 is a front view illustrating an example of a display screen after a gesture is input.

FIG. 19 illustrates an irradiation area image 95 after a gesture is input. FIG. 19 illustrates a state in which a gesture to increase the amount of light of the individual irradiation area 97 in FIG. 18 is made and the size of the identification symbol 73 of the individual irradiation area 97 is larger than that in FIG. 18 in response to the gesture.

Returning to FIG. 17, the gesture detection unit 91 extracts a gesture target image from a through-image obtained from the imaging element 28 using pattern recognition. The image to be subjected to pattern recognition and control conditions in which a meaning is attached to the image are stored as an operation condition table 93 in the memory 39 (see FIG. 2) in advance.

In a case in which a pattern-recognized image is extracted, the gesture detection unit 91 specifies the individual irradiation area from which the pattern-recognized image has been extracted and specifies an illuminating device corresponding to the specified individual irradiation area as the illuminating device whose amount of light is to be adjusted. In addition, for example, the gesture detection unit 91 recognizes that the amount of light is to be increased in a case in which the thumb is up in the extracted image and recognizes that the amount of light is to be decreased in a case in which the thumb is down in the extracted image, on the basis of the operation condition table 93. The gesture detection unit 91 transmits the specification result of the illuminating device whose amount of light is to be adjusted and the amount of adjustment of the amount of light recognized by the gesture to the irradiation area image generation unit 56. For example, the irradiation area image generation unit 56 updates the irradiation area image by, for example, changing the sizes of the identification symbol 73 and the frame 74 depending on the amount of adjustment of the amount of light on the basis of the specification result of the illuminating device whose amount of light is to be adjusted and the amount of adjustment of the amount of light recognized by the gesture, as illustrated in FIG. 11, and displays the irradiation area image as the irradiation area image output unit 57 on the display 19. The photographer 90 observes the image displayed on the display 19 and makes a gesture indicating an OK sign (for example, a gesture to connect the thumb and an index finger into a circle) in a case in which the image is good. The photographer 90 makes a gesture indicating an NG sign (for example, a gesture to make a cross with two index fingers) in a case in which the image is erroneously recognized.

In a case in which the OK sign is recognized by the gesture detection unit 91, the illuminating device whose amount of light is to be adjusted and the amount of adjustment of the amount of light recognized by the gesture are confirmed. The confirmed illuminating device whose amount of light is to be adjusted and the confirmed amount of adjustment of the amount of light are transmitted from the gesture detection unit 91 to the illumination control unit 52. The illumination control unit 52 converts the amount of adjustment of the amount of light recognized by the gesture into a light amount adjustment signal for the illuminating device whose amount of light is to be adjusted. The light amount adjustment signal is transmitted to the illuminating device whose amount of light is to be adjusted by the wireless communication I/Fs 15 and 16 (see FIG. 2). With this configuration, it is possible to simply set the amount of adjustment of the amount of light in the individual irradiation area specified by the gesture. In addition, in this embodiment, as in the touch panel 24 according to the second embodiment, a gesture to tap the identification symbol of the individual irradiation area corresponding to the illuminating device whose amount of light is desired to be adjusted is not required. Therefore, it is possible to simplify a gesture.

Modification Example 4

In the third embodiment, the photographer sees the individual irradiation area corresponding to the illuminating device whose amount of light is desired to be adjusted through the display 19 and makes a gesture in the individual irradiation area corresponding to the illuminating device whose amount of light is desired to be adjusted to specify the individual irradiation area. However, instead of this configuration, as illustrated in FIG. 20, an irradiation area identification symbol may be input by a gesture and then the amount of adjustment of the amount of light corresponding to the individual irradiation area may be input by a gesture. In this case, for example, the individual irradiation area is specified by the number of raised fingers 79. In FIG. 20, since two fingers 79 are raised, the illuminating device whose amount of light is desired to be adjusted is the second illuminating device, that is, the strobe device 12. In addition, in a case in which the finger 79 is up, it is recognized that the amount of light is to be increased. In a case in which the finger 79 is down, it is recognized that the amount of light is to be decreased. In this embodiment, it is possible to adjust the amount of light of each illuminating device at the position of the model 89, without getting near the camera or the illuminating device.

In the third embodiment and Modification Example 4, the photographer 90 stands instead at the position of the model 89 and makes a gesture using a motion of the limbs or body. However, in a state in which the model 89 is at an imaging position, the photographer 90 may stand in the vicinity of the camera, put, for example, a finger into the imaging range of the camera, and make a gesture to specify an individual irradiation area or to input the amount of adjustment of the amount of light to a specific area.

In the above-described embodiments, the operation program installed in the camera 11 is run to make the camera function as the imaging support device and the camera performs the imaging support process. However, for example, a portable terminal, such as a smart phone or a table PC, and the camera may be wirelessly connected with each other such that the portable terminal takes charge of some of the functions of the imaging support device. Specifically, the portable terminal performs the display of the irradiation area image (irradiation area image output unit 57) and the input of the amount of adjustment of the amount of light to the irradiation area image (the touch panel 24 and the gesture detection unit 91 (operation input receiving unit)) and the camera performs, for example, the acquisition of the individual illumination image (image acquisition unit 53) or the control of the illuminating device (illumination control unit 52). The amount of adjustment of the amount of light is input by the touch panel or a gesture. In this case, the photographer can observe the irradiation area image or perform an input operation for the irradiation area image through the portable terminal in the hands, without getting near the camera.

The invention is not limited to the above-described embodiments or modification examples and can adopt various configuration without departing from the scope and spirit of the invention. For example, the above-described embodiments or modification examples may be appropriately combined with each other.

The invention can be applied to, for example, imaging devices of mobile phones and smart phones, in addition to the camera. In addition, the invention is applied to a storage medium storing the program, in addition to the program.

EXPLANATION OF REFERENCES

10: imaging system
11: camera
12, 13: strobe device
14: strobe light emitting unit
15, 16: wireless communication I/F
17: strobe control unit
18: strobe light emitting unit
19: display
20: strobe device
21: lens barrel
22: operation switch
23: rear display unit
24: touch panel
25: imaging optical system
26: stop
27: shutter
28: imaging element
29: main control unit
30: strobe control unit
33: bus
34: memory control unit
35: digital signal processing unit
36: media control unit
37: rear display control unit
38: touch panel control unit
39: memory
40: recording medium
41: shutter driving unit
50: operation program
52: illumination control unit
53: image acquisition unit
54: individual irradiation area detection unit
56: irradiation area image generation unit
57: irradiation area image output unit
61, 62, 63: individual illumination image
64, 65, 66: individual irradiation area
70: division line
72: irradiation area image
73: identification symbol
74: frame
77, 78: irradiation area image
79: finger
80: irradiation area image
81, 82, 83, 84: individual irradiation area
85: integrated area
89: model
90: photographer
91: gesture detection unit
93: operation condition table
95: irradiation area image
96, 97, 98: individual irradiation area
LA: optical axis
S11 to S14, S21, S22: step

What is claimed is:

1. An imaging support device comprising:
an imaging element, including a sensor, that captures an image of an object; and
processing circuitry configured to:
control a plurality of illuminating devices illuminating the object;
control the imaging element such that the image of the object is acquired, selectively turn on the plurality of illuminating devices such that the object is selectively irradiated with illumination light components of the illuminating devices, and acquire individual illumination images which are images of the object individually irradiated with the illumination light components;
detect individual irradiation areas in each of a plurality of the individual illumination images, the individual irradiation areas being areas irradiated with the illumination light components in an imaging range of the imaging element;
generate an irradiation area image obtained by inserting division marks indicating the detected individual irradiation areas into the image of the object; and
output the generated irradiation area image to a display.

2. The imaging support device according to claim 1, wherein the processing circuitry is further configured to detect an area with a relatively high brightness as the individual irradiation area in each of the individual illumination images.

3. The imaging support device according to claim 2, wherein the processing circuitry is further configured to compare brightnesses of the plurality of individual irradiation areas detected from the individual illumination images and display a magnitude relationship between the brightnesses of the individual irradiation areas in the irradiation area image.

4. The imaging support device according to claim 3, wherein the processing circuitry is further configured to represent the magnitude relationship as at least one of sizes of the individual irradiation areas, values corresponding to the brightness of the individual irradiation areas, or values corresponding to comparison results of the brightnesses of the individual irradiation areas in the irradiation area image.

5. The imaging support device according to claim 1, wherein the processing circuitry is further configured to:
receive an input of an operation for adjusting an amount of light of each of the illuminating devices, and
transmit a light amount adjustment signal to each of the illuminating devices in response to the input of the operation.

6. The imaging support device according to claim 5, wherein processing circuitry is further configured to detect a gesture on the basis of the image captured by the imaging element and receives the input of the operation corresponding to the detected gesture, and
specify one individual irradiation area among the plurality of individual irradiation areas that is detected in the imaging range of the imaging element according to the gesture and transmits the light amount adjustment signal to the illuminating device corresponding to the specified individual irradiation area.

7. The imaging support device according to claim 6, wherein each of the plurality of individual irradiation areas that are detected in the imaging range of the imaging element is allocated as a gesture detection area for detecting the gesture as the input of the operation for each illuminating device, and
specify the illuminating device whose amount of light is to be adjusted, on the basis of the gesture detection area in which the gesture is detected among the gesture detection areas.

8. The imaging support device according to claim 5, wherein the display is a touch panel that enables a touch operation, and wherein the processing circuitry is further configured to:
receive the input of the operation by the touch operation through the irradiation area image displayed on the touch panel, and
specify the illuminating device whose amount of light is to be adjusted according to the positions of the individual irradiation areas in the irradiation area image and transmits the light amount adjustment signal to the specified illuminating device.

9. The imaging support device according to claim 8, wherein, in a case in which a pinch operation is performed over the plurality of individual irradiation areas in the touch panel, the processing circuitry is further configured to integrate the plurality of individual irradiation areas in the irradiation area image to generate an integrated area, and in a case in which the input of the operation for the generated integrated area is performed, the processing circuitry is further configured to collectively transmit the light amount adjustment signal to each of the plurality of illuminating devices.

10. A method for operating an imaging support device, the method comprising:

an image acquisition step of controlling a plurality of illuminating devices illuminating an object and an imaging element that captures an image of the object such that the image of the object is acquired, selectively turning on the plurality of illuminating devices such that the object is selectively irradiated with illumination light components of the illuminating devices, and acquiring individual illumination images which are images of the object individually irradiated with the illumination light components;

detecting individual irradiation areas in each of a plurality of the individual illumination images, the individual irradiation areas being areas irradiated with the illumination light components in an imaging range of the imaging element;

an irradiation area image generation step of generating an irradiation area image obtained by inserting division marks indicating the detected individual irradiation areas into the image of the object; and an irradiation area image output step of outputting the generated irradiation area image to a display.

* * * * *